United States Patent
Kaiser et al.

(12)

(10) Patent No.: US 6,391,373 B1
(45) Date of Patent: May 21, 2002

(54) RHEOLOGICALLY MODIFIED CONFECTIONERIES PRODUCED BY EMPLOYING PARTICULAR PARTICLE SIZE DISTRIBUTIONS

(75) Inventors: John M. Kaiser, Manheim; Sandy A. S. Purwo, Lititz, both of PA (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 09/660,350

(22) Filed: Sep. 12, 2000

Related U.S. Application Data

(63) Continuation of application No. PCT/US99/05451, filed on Mar. 12, 1999, which is a continuation of application No. 09/041,842, filed on Mar. 12, 1998, now abandoned.

(51) Int. Cl.$^7$ .............................................. A23G 1/00
(52) U.S. Cl. ..................... 426/631; 426/93; 426/660
(58) Field of Search ........................... 426/93, 631, 660

(56) References Cited

U.S. PATENT DOCUMENTS

| | | | |
|---|---|---|---|
| 4,282,006 A | 8/1981 | Funk .............................. | 44/51 |
| 4,477,259 A | 10/1984 | Funk .............................. | 44/51 |
| 4,567,099 A | 1/1986 | Van Gilder et al. ........... | 428/327 |
| 4,713,256 A * | 12/1987 | Chaveron ...................... | 426/631 |
| 5,080,923 A | 1/1992 | Martin et al. ................. | 426/658 |
| 5,185,175 A * | 2/1993 | Loh ............................... | 426/631 |
| 5,190,786 A * | 3/1993 | Anderson ....................... | 426/631 |
| 5,238,698 A * | 8/1993 | Zumbe ........................... | 426/572 |
| 5,266,348 A * | 11/1993 | Zumbe ........................... | 426/660 |
| 5,433,970 A | 7/1995 | Wong et al. .................... | 426/633 |
| 5,464,649 A * | 11/1995 | St John ......................... | 426/660 |
| 5,490,999 A | 2/1996 | Villagran et al. .............. | 426/633 |
| 5,501,865 A * | 3/1996 | Zumbe ........................... | 426/660 |
| 5,505,982 A * | 4/1996 | Krawczyk ....................... | 426/660 |
| 5,508,057 A | 4/1996 | Wong et al. .................... | 426/633 |
| 5,518,755 A | 5/1996 | Wong et al. .................... | 426/633 |
| 5,709,903 A * | 1/1998 | St John ......................... | 426/660 |
| 5,882,709 A * | 3/1999 | Zumbe ........................... | 426/481 |
| 5,932,277 A * | 8/1999 | Dubberke ....................... | 426/631 |
| 5,989,619 A * | 11/1999 | Zumbe ........................... | 426/631 |

FOREIGN PATENT DOCUMENTS

| | | | |
|---|---|---|---|
| GB | 2033721 | * | 9/1979 |
| WO | WO 96/19923 | * | 4/1996 |
| WO | WO 96/17523 | * | 6/1996 |
| WO | WO 99/45790 | | 9/1999 |

OTHER PUBLICATIONS

Mongia & Ziegler Particle Size Distribution Affects the Rheology of Milk Chocolate Presented at Fine Powders Processing 1997 Sep. 15, 1997 Penn State University.*
Mongia & Ziegler Packing of Suspended Solids and Rheology of Molten Milk Chocolate During Conching Presented at Fine Powders Processing 1997 Sep. 15, 1997 Penn State University.*

Beckett 1988 Industrial Chocolate Manufacture and Use Blackie Academic & Professional, New York.*
Minifre 1980 Chocolate, Cocoa & Confectionery Science & Technology 2nd Edition AVI Publishing Co.. Inc Westport CT p 323–325.*
Cheng et al., "The Effect of Particle Size Distribution on the Rheology of an Industrial Suspension," *Journal of Materials Science*, 25, 353–373 (1990).
Bierwagen and Saunders, "Studies of the Effects of Particle Size Distribution on the Packing Efficiency of Particles," *Powder Technology*, 10, 111–119 (1974).
Dinger and Funk, "Predictive Process Control of Crowded Particulate Systems Applied to Ceramic Manufacturing," *Kulwer Academic Publishers*, Boston, Mass. (1994), Chapter 8 (pp. 95–103), Chapter 9 (pp. 105–120) and Chapter 36 (pp. 571–596).
Fischer, "Particle Size Distribution Effects on Rheology of Molten Dark Chocolate," M.S. Thesis, Pennsylvania State University (1994).
J. Bouzas et al., "Interactions Affecting Microstructure, Texture and Rheology of Chocolate Confectionery Products," *Ingredient Interactions, Effects on Food Quality*, Ed. A.G. Gaonkar, Marcel Dekker, Inc., New York, NY (1995), Chapter 16 (pp. 451–528).
D. I. Lee, "Packing of Spheres and Its Effect on the Viscosity of Suspensions," *J. Paint Technology*, 42 (550) 579–587 (1970).
P. A. Smith et al., "Effect of Particle Packing on the Filtration and Rheology Behavior of Extended Size Distribution Alumina Suspensions," *J. Am. Ceram. Soc.*, 78(7) pp. 1737–1744 (1995).
S. T. Beckett et al., *Industrial Chocolate Manufacture and Use*, Blackie Academic and Professional, St. Ives, England (1994) p. 146.

(List continued on next page.)

Primary Examiner—Carolyn Paden
(74) Attorney, Agent, or Firm—Fitzpatrick, Cella, Harper & Scinto

(57) ABSTRACT

This invention relates to confectioneries, and particularly reduced fat chocolates comprising an admixture of non-fat chocolate ingredients in accordance with specified particle size distribution formulae, and the method of preparation thereof. Controlling particle packing, using continuous particle size ingredient distributions and discrete, bi-modal particle size ingredient distributions, has been shown to be useful for achieving highly concentrated chocolate suspensions, having reduced fat concentrations and suitable rheology for moulding, enrobing or extrusion. The methods of this invention are also useful for providing conventional chocolates (25% or greater fat content) having good rheological characteristics, while reducing cocoa butter usage. Specified particle size distributions are achieved through the selective blending of fine, medium and coarse ingredients. The continuous particle size distributions and bi-modal particle size distributions provide several parameters for manipulating the rheological properties of chocolate.

40 Claims, 7 Drawing Sheets

OTHER PUBLICATIONS

L.Y. Sadler et al., "Minimize Solid–Liquid Mixture Viscosity by Optimizing Particle Size Distribution," *Chem. Eng. Progress,* 68–71, Mar. (1991).

G. Hogenbirk, "Viscosity and Yield Value for Chocolate and Coatings—What they mean and how to influence them", Part One; *Confectionery Production,* pp. 456–457 and 478, Aug. (1988).

G. Hogenbirk, "Viscosity and Yield Value for Chocolate and Coatings—What they mean and how to influence them", Part Two; *Confectionery Production,* pp. 82–83 Jan. (1989).

* cited by examiner

RHEOLOGICALLY MODIFIED CONFECTIONERIES PRODUCED BY EMPLOYING PARTICULAR PARTICLE SIZE DISTRIBUTIONS

This application is a continuation of International Application No. PCT/US99/05451, filed Mar. 12, 1999, which is a continuation of U.S. patent application Ser. No. 09/041,842, filed Mar. 12, 1998, now abandoned. The entire disclosure of each of these applications is incorporated by reference herein.

BACKGROUND OF THE INVENTION

1. Field of the Invention

The present invention relates to confectioneries and their methods of preparation. Improving the packing of solids-containing ingredients provides the confectioneries of this invention having a total fat content of about 16% to about 35% by weight and with desirable rheology characteristics. The confectioneries of the present invention demonstrate good performance when used in enrobing, moulding or extruding operations.

2. Related Background Art

Confectionery food products, made from ingredients including carbohydrate sweeteners, such as sucrose, milk solids, cocoa solids and an edible oil or fat, such as cocoa butter, are well known. Candy, and particularly chocolate, comprise an important group of these food products.

The most popular chocolate or chocolate candy consumed in the United States is in the form of sweet chocolate or milk chocolate. Chocolate is a dispersion of very fine, solid ingredient particles suspended in a fat phase. Milk chocolate is a confection which contains milk solids, milk fat, chocolate liquor, a nutritive carbohydrate sweetener, cocoa butter and may include a variety of other ingredients such as emulsifying agents, flavorings and other additives. Crumb chocolate is a type of milk chocolate wherein wet milk and carbohydrate sweetener ingredients, and optionally chocolate liquor, are pre-combined then co-dried, at elevated temperatures, to form a milk crumb. The milk crumb is then used to prepare this type of milk chocolate. Sweet chocolate contains higher amounts of chocolate liquor, but lower amounts of milk solids than milk chocolate. Semi-sweet chocolate requires at least 35% by weight chocolate liquor and is otherwise similar in definition to sweet chocolate. Dark chocolate, generally containing only chocolate liquor, a nutritive carbohydrate sweetener and cocoa butter, is by definition either a sweet chocolate or a semisweet chocolate. Buttermilk chocolate and skim milk chocolate differ from milk chocolate in that the milk fat comes from various forms of sweet cream buttermilk and skim milk, respectively. Skim milk requires the total amount of milk fat to be limited to less than the minimum for milk chocolate. Mixed dairy product chocolates differ from milk chocolate in that the milk solid includes any or all of the milk solids listed for milk chocolate, buttermilk chocolate or skim milk chocolate. White chocolate differs from milk chocolate in that it contains no non-fat cocoa solids.

Chocolate may take the form of solid pieces of chocolate, such as bars or novelty shapes, and may also be incorporated as a component of other, more complex confections where chocolate is combined with and generally coats other foods such as caramel, peanut butter, nougat, fruit pieces, nuts, wafers, ice cream or the like. These foods are characterized as microbiologically shelf-stable at 65°–85° F. (18–29° C.), under normal atmospheric conditions. Generally, chocolate used to coat or surround foods must be more fluid than chocolates used for plain chocolate solid bars or novelty shapes.

The process of coating chocolate onto a food is known as enrobing. Enrobing is accomplished when chocolate, in a fluid state and having a proper viscosity and yield value, is poured over a food to completely cover the food. Alternatively, the food may be dipped into the fluid chocolate. Proper viscosity and yield value of the chocolate are required for smooth and even flow of the chocolate over the surface of the food to be coated.

Chocolate can also be moulded. By moulding, it is meant that chocolate, either plain or mixed with nuts, raisins, crisped rice and the like, is deposited in moulds, allowed to cool and hardened into solid pieces and then removed from the mould. Chocolate moulded into plain chocolate pieces may be somewhat more viscous than coating chocolates since the chocolate can be vibrated into a mould over a longer period of time than allowed in enrobing.

Novelty shapes, such as chocolate chips, made of plain chocolate may be formed by extrusion, typically onto a cold belt. Extrusion may also be conducted using chocolate in a solid or semi-solid state. Other forming techniques known in the art include flaking, kibbling, sheeting, depositing and the like. The chocolate used for extrusion must be more resistant to flow than chocolate used for moulding and have a high yield value. Chocolates used in extruding operation typically will have yield values of less than 600 dynes/cm$^2$ and plastic viscosity values of less than 100 poise. The relatively high viscosity and yield value are necessary for the chocolate to retain the extruded shape as it hardens.

Since melted chocolate is a suspension of solid particles, e.g., sugar, milk powders and cocoa solids, in a continuous liquid fat phase of cocoa butter, chocolate suspensions have non-Newtonian flow behavior including the presence of a yield stress. The yield stress represents a minimum threshold of force that must be applied to a suspension, for example the force applied to toothpaste, in order to make it flow. Below this threshold, no flow occurs. The non-Newtonian behavior of chocolate is sometimes described by fitting the rheological data to the Casson equation which defines a Casson yield value and Casson plastic viscosity. This minimum force mentioned above is then referred to as the "Casson yield value". The "Casson plastic viscosity" approximates the work needed to keep the suspension flowing uniformly. Alternatively, an apparent viscosity can be used to describe the flow behavior of chocolate. The rheological characteristics of chocolate, and the ability to maintain control over the rheology of chocolate are very important. Chocolate is a suspension of very fine particles (usually less than 50–60 microns) in fat (cocoa butter, milk fat). The cocoa butter coats and suspends the particles and provides the mouthfeel typically associated with a smooth, rich chocolate. The amount of cocoa butter present in chocolate affects the rheological properties of the chocolate and, consequently, must be varied according to the intended use of the chocolate. However, when the cocoa butter (fat) content of chocolate is reduced to prepare reduced-fat chocolates, alternate means of achieving the proper rheological properties of the chocolate must be developed. Emulsifiers, e.g. lecithin, have long been used to enhance the rheological properties of commercial chocolates. Exemplary emulsifiers include lecithin derived from vegetable sources such as soybean, safflower, corn, etc., fractionated lecithins enriched in either phosphatidyl choline, phosphatidyl ethanolamine, phosphatidyl inositol or any combination, mono- and di-glycerides, phosphated mono- and di-glycerides/diacetyl tartaric acid esters of mono- and di-glycerides (PMD/DATEM), monosodium phosphate derivatives of mono- and di-glycerides of edible fats or oils, sorbitan monostearate, polyoxyethylene sorbitan monostearate, hydroxylated lecithin, polyglycerol esters of fatty acids, polyglycerol polyricinoleate (PGPR), propylene glycol mono and di-esters of fats and fatty acids, and the like.

The addition of about 0.1–0.3% by weight soy lecithin typically reduces the viscosity of chocolate by more than 10 times its own weight of cocoa butter. Numerous other emulsifiers similarly lower the yield value or the plastic viscosity. Emulsifier use has generally been limited to less than 1% by weight of the chocolate formulation due to problems such as off-flavors, legal controls, or negative rheological effects occurring at higher use rates. Since full-fat chocolates, having about 25% to 36% by weight total fat, typically contain about 0.1% to about 0.5% by weight soy lecithin, significantly lower fat levels cannot be achieved by merely altering the amount of emulsifier incorporated into the chocolate.

Particle size of the non-fat solid ingredients is also known to influence the viscosity of chocolate. Generally, as the particle size of the solids-containing ingredients decreases, viscosity increases. Moreover, it is also recognized that particles below 5 microns will make the chocolate extremely thick and difficult to manage during pumping, depositing, and enrobing operations. Conversely, use of coarse particles of the solids-containing ingredients will decrease viscosity. However, coarse particles having a particle size greater than 60 microns will give the chocolate an unacceptable gritty sandy texture.

The presence of fines (or ultra-fine) particles are considered to adversely influence the rheological properties of chocolate. At least 50% of the surface area of milk chocolate solids is thought to be from particles below 2 micron in size. U.S. Pat. No. 5,080,923 discloses dissolving ultra-fine particles and recrystallization onto larger sucrose particles to reduce the total surface area of the solids-containing ingredients. This process however, provides chocolates having unacceptably high viscosity values as the fat content is reduced to near 20%. Plastic viscosity values related to the amount of work required to keep a chocolate suspension flowing. PCT International Publication No. WO 96/19923 discloses a process for producing chocolate with a total fat content between 18% to 24.9% by weight. Less than 1% by weight of the particles of this chocolate would have a diameter above 60 microns and not more than 20% by weight of the particles would have a diameter less than 3 microns.

The high solids content of chocolate has prompted some workers to examine the particle size distributions present in manufactured chocolates. Much of the work reported in the literature relies on one of two assumptions for particle packing: first, that particles have a discrete size and second, that particles are in a continuous distribution. Two approaches developed for the study of particle distributions, and used in the method of the present invention, are the discrete particle approach and the continuous distribution approach.

The discrete particle approach idealizes particle packing as a function of the diameter ratio of two or more discrete sizes of particles. A bi-modal particle distribution is characterized by a particle distribution having two separate and essentially non-overlapping particle distributions. Typically, there are particles with two discrete sizes: a coarse size, and a fine size having a size about ⅒ the coarse size. The continuous distribution approach idealizes particle packing based upon the concept that improved packing occurs when a well defined concentration of particle sizes are used between the largest and smallest particles in a distribution.

The packing of particles has both practical and theoretical interest in a number of disciplines not related to confectioneries, for example, in the ceramics and paint industries. Cheng et al., (*Journal of Material Science* 25, 353–373 (1990)) investigated the effect of particle size distributions on the rheology of dental composites. Narrow sized fine (0.2 microns), medium (1.7 microns), and coarse (25.5 microns) particle fractions were blended into bi-modal and tri-modal distributions. Minimum viscosity was predicted for bi-modal blends when 20% to 40% by weight of the solids was a small size. U.S. Pat. No. 4,567,099 describes the use of a bi-modal particle size distribution to prepare high solids content latex paper coatings.

Bierwagen and Saunders (*Power Technology*, 10, 111–119 (1994)) quantitatively studied the effects of particle size distribution on particle packing for paint pigments. Very high packing efficiencies were possible when particle distribution modes were very dissimilar. This is the effect of packing small particles in the interstices of larger particles. Continuous distributions had maximum packing when the concentration of the coarse sized distribution was between 60 and 80%, by weight, of the total solids.

Dinger and Funk (*Predictive Process Control of Crowded Particulate Systems Applied to Ceramic Manufacturing, Kulwer Academic Publishers* (1994)) derived the following Equation (1) to determine the cumulative percent of particles in a continuous distribution that is finer than a specified particle size (CPFT), based on the Andreasen packing theory, with an added term to account for the smallest particles in the distribution.

$$\frac{CPFT}{100\%} = \frac{D^n - D_s^n}{D_L^n - D_s^n} \qquad \text{Eqn. (1)}$$

$D_L$=the diameter size of the largest particle in the distribution $D_s$=the diameter size of the smallest particle in the distribution D=a selected particle size in the distribution n=numerical exponent, with n being in the range of about 0.2 to about 0.7.

Funk, U.S. Pat. Nos. 4,282,006 and 4,477,259, the disclosure of which is incorporated herein by reference, applied this equation to the problem of transport of coal/water mixtures.

Milk chocolate is a concentrated suspension of sucrose, cocoa solids and milk solids dispersed in cocoa butter and milk fat. Chocolate is typically 25% to 36% total fat, by weight. Stated in another manner, chocolate is a suspension of solids in a fat containing 0.64–0.58 volume fraction of solids. Fischer ("*Particle Size Distribution Effect on Rheology of Molten Dark Chocolate*," M. S. Thesis, Pennsylvania State University (1994)) prepared a set of dark chocolates having 25% total fat, by weight. The solids-containing ingredients for each chocolate were selected to have a narrow uni-modal, wide uni-modal, or bi-modal particle distributions, having the same relative mean diameter. The plastic viscosity of these samples decreased as the particle size distribution became 'wider'. The bi-modal distribution sample demonstrated the lowest plastic viscosity, but the highest yield value. Fischer concluded that the advantage of the bi-modal approach could only be utilized where a higher yield value could be tolerated.

Mongia and Ziegler ("*Particle Size Distribution Affects the Rheology of Milk Chocolate*," presented at Fine Powders Processing 1997, Sep. 15, 1997, Pennsylvania State University) studied the effect of particle size distribution on suspension rheology for a milk chocolate coating at 27.7% by weight total fat, prepared by blending coarse sugar fractions with finely ground sugar, milk and defatted cocoa powder. The Casson viscosity was shown to decrease for the mixtures of coarse and fine ingredient blends and to reach a minimum at 50% coarse concentration. The ratio of particle sizes in the coarse and fine fractions was about 2:1. The yield value had a linear dependence on mean particle size and the lowest apparent viscosity was obtained when the coarse fraction was between 65% to 70% by weight of the total solids mixture.

As described above, chocolate is a highly concentrated suspension of solids-containing ingredients in fat and research has indicated that the particle packing of the ingredient mixture can affect the rheology of the final chocolate. Although some progress has been made to better understand and improve chocolate rheology, further improvements are required to more predictably control the viscosity and yield value of chocolate. Moreover, such improvements are necessary to provide chocolates that have useful rheological properties and full-fat texture, that are very low in fat, e.g., with total fat content below 20% by weight.

SUMMARY OF THE INVENTION

This invention relates to a chocolate, having about 16% to about 35% total fat, by weight, having low viscosity and other rheological properties required for enrobing, moulding or extruding operations. A particularly preferred embodiment relates to a reduced-fat chocolate, having about 16% to about 24.5% by weight total fat and having suitable viscosity and other rheological properties required for enrobing, moulding or extruding operations. The invention further relates to novel methods for making the chocolates of this invention.

A confectionery of this invention comprises an admixture of solids-containing ingredients and fat, having a yield value of less than 1000 dynes/cm$^2$, wherein said solids-containing ingredients have a bi-modal particle distribution and comprise particles having a diameter of about 0.05 microns to about 100 microns. The bi-modal particle distribution contains a fine particle mode distribution containing particles having a mean particle size of about 0.5 to about 7 microns, and a coarse particle mode distribution containing particles having a mean particle size of about 15 to about 50 microns. The particles in the fine particle mode distribution contain about 20% to about 40% by weight of the solids-containing ingredients and the particles in the coarse particle mode distribution contain about 60% to about 80% by weight of the solids-containing ingredients, based on the weight of de-fatted ingredients. In another embodiment, a confectionery of this invention comprises an admixture of solids-containing ingredients and fat, containing about 16% to about 35% by weight total fat and having a yield value of less than 1000 dynes/cm$^2$, wherein the solids-containing ingredients comprise particles having a particle size distribution of about 0.05 microns to about 100 microns, and have a particle size distribution in accordance with the following formula:

$$\frac{CPFT}{100\%} = \frac{D^n - D_s^n}{D_L^n - D_s^n}$$

wherein,

CPFT=cumulative percent of particles in a continuous distribution having a particle size finer than a specified particle size;

$D_L$=the largest particle diameter size in the distribution;

$D_s$=the smallest particle diameter size in the distribution;

D=a particle size in the distribution;

n=about 0.2 to about 0.7.

The solids-containing ingredients having a particle size of about 0.05 microns to about 30 microns may be selected from cocoa solids-containing ingredients, carbohydrates, milk solids-containing ingredients and ingredient combinations thereof, and preferably, may be cocoa solids-containing ingredients and/or milk solids-containing ingredients. The solids-containing ingredients having a particle size of about 30 microns to about 100 microns may be selected from cocoa solids-containing ingredients, carbohydrates, milk solids-containing ingredients and ingredient combinations thereof.

DETAILED DESCRIPTION OF THE INVENTION

Figure 1:
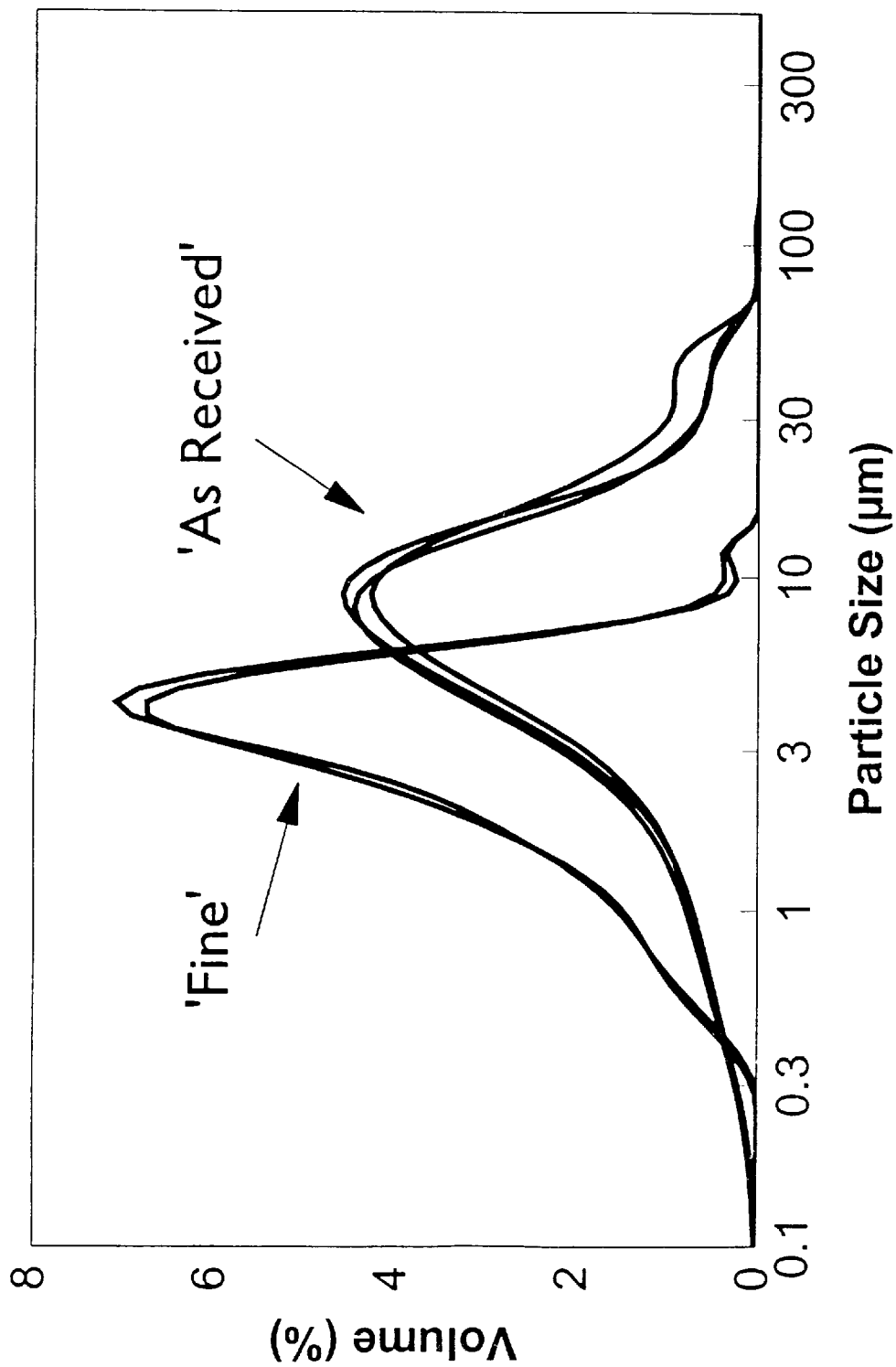
FIG. 1 illustrates the particle size distribution of a representative "Fine Grind" particle distribution of a solids-containing ingredient, obtained by selective milling relative to the "As Received" particle distribution of the ingredient as obtained from commercial sources.

The confectionery compositions of the present invention are obtained from novel combinations of solids-containing ingredients, wherein the particle sizes of the solids and their distribution are controlled in accordance with particle size distribution formulae which are especially beneficial for providing the confectionery with a minimum amount of void space between particles, that is, having high particle density and low interstitial porosity. In addition, the particle size distributions used herein require an advantageous amount of fine sized particles to attain preferred particle packing. This novel combination of solids-containing ingredient particles used in the present invention enhances the dispersing effects of fat (cocoa butter and milk fat) and any added emulsifying agents to provide a low-fat or reduced-fat chocolate confectionery composition having the texture of a full-fat chocolate with desirable rheology characteristics.

The term "fat" as used herein, refers to triglycerides typically used in food products, especially confectionery and chocolate products. Fats useful in this invention include the naturally occurring fats and oils such as cocoa butter, pressed cocoa butter, expeller cocoa butter, solvent extracted cocoa butter, refined cocoa butter, milk fat, anhydrous milk fat, fractionated milk fat, milk fat replacers, butterfat, fractionated butterfat, and other vegetable fat, as well as other modifications of these fats, including cocoa butter equivalents (CBE), cocoa butter substitutes (CBS), cocoa butter replacers (CBR), anti-blooming agents, such as behenoyl oleoyl behenate (BOB), reduced calorie fats and/or synthetically modified fats, including reduced calorie fats and non-caloric fat substitutes. A reduced calorie fat is a fat having all the properties of typical fat but having fewer calories. A non-caloric fat substitute, e.g. a sucrose polyester, likewise possesses all the typical fat characteristics, but is not absorbed after ingestion and thus is not metabolized. A "full-fat" chocolate has a total fat content greater than 25% by weight and typically, a total fat content of about 25% to about 35% by weight. A "reduced-fat" chocolate has a total fat content less than 25% by weight and typically, a total fat content of about 19% to about 24.5% by weight.

"Carbohydrates" as used herein, refers to nutritive carbohydrate sweeteners, with varying degrees of sweetness intensity that are useful in the present invention, and may be any of those typically used in the art. Exemplary carbohydrates include, but are not limited to, sucrose, (e.g., from cane or beet), dextrose, fructose, lactose, maltose, glucose syrup solids, corn syrup solids, invert sugar, hydrolyzed lactose, honey, maple sugar, brown sugar, molasses and the like. The nutritive carbohydrate sweetener, preferably sucrose, will be present in the chocolate as crystals or particles.

"Chocolate" as used herein refers to chocolate used in foods in the United States is subject to a standard of identity established by the U.S. Food and Drug Administration (FDA) under the Federal Food, Drug and Cosmetic Act that sets out the requisite ingredients, and proportions thereof, of a confection to permit labelling of the confection as a "chocolate." Non-standardized chocolates are those chocolates which have compositions which fall outside the specified ranges of the standardized chocolates. Chocolates are classified as "non-standardized" chocolates when a specified ingredient is replaced, either partially or completely, such as when the ingredient cocoa butter is replaced with vegetable oils or fats. Any additions or deletions to a chocolate recipe made outside the US FDA standards of identity for chocolate will prohibit use of the term "chocolate" to describe the confectionery. However, as used herein, the term "chocolate" refers to any chocolate confectionery composition and includes both standard of identity and non-standardized chocolates and other cocoa-containing confectioneries, as well as white chocolate, a non-cocoa-containing confectionery.

An example of a non-standardized chocolate is one wherein a sugar substitute is used to partially replace the nutritive carbohydrate sweetener. As used herein, the term "sugar substitute" includes bulking agents, sugar alcohols (polyols), or high potency sweeteners or combinations thereof. The high potency sweeteners include aspartame, cyclamates, saccharin, acesulfame, neo-hesperidin dihydrochalcone, sucralose, alitame, stevia sweeteners, glycyrrhizin, thaumatin, and the like, and mixtures thereof. The preferred high potency sweeteners include aspartame, cyclamates, saccharin, and acesulfame-K. Examples of sugar alcohols may be any of those that are typically used in the art in combination with high potency sweeteners and include sorbitol, mannitol, xylitol, maltitol, isomalt, lactitol and the like. Bulking agents as defined herein may be any of those typically used in the art and include polydextrose, cellulose and its derivatives, maltodextrin, gum arabic, and the like.

The chocolates of the present invention may additionally contain other ingredients such as milk solids, cocoa solids, sugar substitutes, natural and artificial flavors (e.g., vanilla, spices, coffee, salt, brown nut-meats, etc., as well as mixtures of these), antioxidants (e.g., preservatives), proteins, and the like. Cocoa solids may be derived from cocoa nib, such as chocolate liquor and partially or fully de-fatted cocoa powder.

Emulsifiers are also used as ingredients in the chocolates and reduced-fat chocolates of the present invention. Emulsifiers are well known to play a critical role in suspension rheology and are used throughout chocolate manufacturing to enhance the rheology (i.e., reduce viscosity and/or yield value) of cocoa solids-containing suspensions. Soy lecithin is the oldest and most widely used emulsifier for chocolate, and when used at a preferred concentration of about 0.3% to about 0.7% by weight of the finished chocolate, demonstrates a significant viscosity lowering effect. It is well recognized that some emulsifiers contain fat. For example, soy lecithin contains approximately 40% fat, by weight. Accordingly, use of about 0.3% to about 0.7%, by weight lecithin, in a chocolate will increase the total fat content of a finished chocolate by about 0.1% to about 0.3% by weight.

Any of the emulsifiers known in the art and described hereinabove may be useful in the preparation of the reduced-fat chocolates of the present invention having good rheological characteristics. Thus, one skilled in the art may select an emulsifier for use in the preparation of a reduced-fat confectionery of the present invention to further enhance the rheology of a suspension of solids-containing chocolate ingredients, prepared having a bi-modal or continuous particle size distribution, to provide a suspension useful for a desired application, e.g., enrobing, extruding or moulding.

In a particularly preferred embodiment of this invention, selected emulsifier combinations may be employed to further enhance the rheology of the reduced-fat chocolates over confectioneries prepared using conventional emulsifiers. Emulsifier combinations that are particularly useful in the reduced-fat confectioneries of present invention are combinations of lecithin, sucrose polyerucate (ER-290, sold by Mitsubishi Kasei Corporation, Japan), sucrose polystearate (sold by Mitsubishi Kasei Corporation, Japan), ammonium phosphatide, phosphated mono-di-glycerides/diacetyl tartaric acid of mono glycerides (PMD/DATEM), and/or fractionated lecithin (enriched in either phosphatidylcholine or phosphatidyl ethanolamine, or phosphatidyl inositol, or mixtures thereof) with at least one other emulsifying agent selected from sucrose polyerucate and/or polyglycerol polyricinoleate (PGPR—Admul WOL®, sold by Quest International, Hoffman Estates, Ill.). Advantageously, the emulsifier combinations of polyglycerol polyricinoleate, sucrose polyerucate, ammonium phosphatides and soy lecithin, offer significant improvement in the rheology of the chocolates of the present invention, and particularly of the reduced-fat chocolates of the present invention. Preferred emulsifying agent combinations include: (i) lecithin and polyglycerol polyricinoleate, (ii) lecithin, ammonium phosphatides and polyglycerol polyricinoleate, (iii) lecithin and sucrose polyerucate, (iv) polyglycerol polyricinoleate and sucrose polyerucate, and (v) lecithin, polyglycerol polyricinoleate, and sucrose polyerucate. Use of combinations of these preferred emulsifying agents provides the reduced-fat chocolates of this invention having good viscosity and yield value. Various chocolates using the emulsifier combinations of polyglycerol polyricinoleate, sucrose polyerucate, and soy lecithin, are described in co-pending U.S. patent application Ser. No. 09/041,325, filed Mar. 12, 1998, and which is incorporated by reference herein.

The combination of sucrose polyerucate and soy lecithin imparted very low Casson values to the reduced-fat confectioneries of the present invention. This effect was noted at levels up to 1.0% by weight sucrose polyerucate and 0.5% by weight soy lecithin. A particular advantage of this combination is the reduction of both plastic viscosity and yield values. The combination of polyglycerol polyricinoleate (PGPR) and lecithin significantly reduced the yield value of a 20% total fat chocolate and illustrates the advantageous improvement in rheology that can be achieved in the reduced-fat confectioneries of the present invention. PMD/DATEM, fractionated soy lecithin, and ammonium phosphatides (YN) also improved the rheological characteristics of reduced-fat chocolates of the present invention.

As used herein, the term "good rheological characteristics" means that the chocolate, either having full fat or reduced-fat content, has a Casson yield value and Casson viscosity such that the chocolate is suitable for processing in enrobing, extruding or moulding operations to form a finished chocolate. To be suitable for such processing operations, the chocolates of the present invention have a Casson yield value less than 1000 dynes/cm$^2$; or alternatively, less than about 200 dynes/cm$^2$, less than about 150 dynes/cm$^2$ or less than about 100 dynes/cm$^2$. To be suitable for such processing operations, the chocolates of the present invention may have a Casson (plastic) viscosity less than about 200 poise, or alternatively, less than about 100 poise. Alternatively, the chocolates of the present invention may have a Casson viscosity of less than about 80 poise and a Casson yield value less than about 200 dynes/cm$^2$, or a Casson viscosity of less than about 30 poise and a Casson yield value less than about 200 dynes/cm$^2$, or a Casson viscosity of less than about 50 poise and a Casson yield value less than about 150 dynes/cm$^2$, or a Casson viscosity of less than about 60 poise and a Casson yield value less than about 100 dynes/cm$^2$, or a Casson viscosity of less than about 40 poise and a Casson yield value less than about 100 dynes/cm$^2$. The requirements of the different processing operations will dictate the preferred viscosities and yield values of the chocolate.

Suspension rheology is a function of several particle properties: particle size distribution, mean particle size, shape, roughness, surface chemistry, surface area, composition and crystallinity, among others. Processing of the particle suspension is also important in development of suspension rheology. Conching is considered to be the critical process step in chocolate manufacturing wherein the chocolate reaches its minimum viscosity for a given recipe. Conching can be described as the "working" of chocolate flake or crumb into a fluid paste that produces a wide range of effects, including flavor development of the chocolate paste and agglomerate reduction. Conching is a mixing-kneading process wherein the refined chocolate ingredients are typically placed in an agitated rotary device and sheared, or mixed, for several hours. Conching temperatures range from 55° C. to 85° C. for sweet chocolate and from 45° C. to 65° C. for milk chocolate. Conching time varies from a few hours to several days depending on manufacturer preference and desired flavor. This process permits development of subtle flavors in the chocolate and allows moisture and volatile components to escape as the chocolate paste becomes a smooth fluid. At the end of the conching process, the chocolates of the present invention have a micrometer particle size of less than 50 microns. Alternatively, the finished chocolate may have a micrometer particle size of less than 40 microns or less than 30 microns.

The chocolate of the invention is prepared by a process which comprises providing a mixture of the solids-containing chocolate ingredients as finely-divided particles having particle sizes in the range from about 0.05 microns to about 100 microns and having a distribution of particle sizes designed to minimize the void space between particles.

Particle size may be measured by any of several techniques known in the art. The particle size of the finished chocolates are generally determined using micrometer. The mean particle size of a distribution is defined as a mean volume particle diameter over a given distribution, as measured using the Coulter® laser light scattering technique. The largest and smallest particle size in a given distribution may be determined by scanning electron microscope (SEM) laser light scattering or the like.

Significantly, it has been found that improving the packing efficiency of the solids-containing ingredient particles in this manner minimizes the amount of fat and/or emulsifier required to fluidize the suspension. Accordingly, the particle size distributions of the solids-containing ingredients used to prepare the chocolates of the present invention provides an important means to minimize the fat content of the resulting chocolate.

Two general particle size distribution methods may be employed to obtain the improved rheology of the chocolates of the present invention: a discrete, bi-modal particle distribution and a continuous particle distribution. Specific particle size distributions may be achieved through blending of fine, medium and coarse chocolate ingredients. Surprisingly, the present inventors have recognized that fine particles are not only desirable, but are actually necessary to achieving enhanced suspension rheology. Moreover, to obtain ideal particle packing, fine particles must be present at well defined concentrations to obtain the chocolates of this invention having good rheological properties.

The presence of fine particles are known to influence the yield value of chocolate. Controlling the level and type of fine particles is necessary to achieve a desired rheology. In the practice of the present invention, the rheological behavior and contribution of fine particles and coarse particles of each of the non-fat solid ingredient used in a desired chocolate recipe should optionally be determined prior to preparation of the chocolate. Preparation of "fine" grinds of each ingredient may be obtained using air jet milling or other mills to obtain similar particle distributions having mean sizes below 5 microns. Methods of air jet milling are well known to those skilled in the art. FIG. 1 illustrates the particle size distribution of a representative "Fine Grind" particle distribution of a non-fat solid ingredient, obtained by selective milling and classification, relative to the "As Received" particle distribution of the ingredient as obtained from commercial sources. Suspensions of each of the fine grind and coarse fraction particle distributions, containing 40% by weight of a specific ingredient in fat, generally cocoa butter, may be prepared to determine the rheological contributions of each separate ingredient at different particle sizes, as described in Example 1. A "fine grind" ingredient suspension having a high yield value typically indicates that the ingredient should preferably comprise the coarse particles of a distribution mixture. A "fine grind" ingredient suspension having a low yield value indicates that the ingredient should preferably comprise the fine particles of a distribution mixture.

The rheology of fat-based compositions containing crystalline carbohydrates, i.e. sugars, follows an inverse relationship to particle size. It is well established that the viscosity of sugar/fat suspensions decreases as the mean particle size of the sugar increases, for a sample having a mono-modal particle size distribution. Accordingly, sugar should preferably comprise the coarse particles in a distribution. Sugar should preferably be ground to a mean particle size of about 10 microns to about 50 microns, and more preferably, to a mean particle size of about 20 microns to about 35 microns.

The rheology of fat-based compositions containing spray dried milk solids is influenced by the presence of entrapped air (vacuole volume) within its structure, and densifying these solids prior to use, by particle size reduction, extrusion, or crystallization of the lactose prior to spray drying, is preferred. Milk solids should preferably comprise the fine particles in a distribution. Milk solids should preferably be ground to have a mean particle size of about 1 microns to about 7 microns, and more preferably, be ground to have a mean particle size of about 2 microns to about 4 microns.

Cocoa solids are more variable in behavior, and the rheology of fat-based compositions containing fine and coarse particles of each type of cocoa powder (variety, treatment process, etc.) should be established prior to use. In general, cocoa solids are known to form suspensions having higher viscosities and/or yield value than suspensions of milled milk powders, or sugars. According to the general understanding of cocoa rheology, reduction of the particle size of defatted cocoa powder would be expected to increase the amount of cocoa butter required to prepare a cocoa/fat suspension having low viscosity. Surprisingly, the present inventors have determined that fine size (smaller than 4 microns) particles of certain cocoa defatted powders, require the same or even lower amounts of cocoa butter, to form suspensions that are equi-viscous to suspensions prepared from coarser sized (7–12 microns) powders (i.e. As Received). For example, Table 1, below, shows the plastic viscosity and yield values for fat suspensions of a set of coarse and fine ingredients. Surprisingly, suspensions of finely ground samples (having a mean particle size of approximately 5 microns) of de-fatted cocoa powders possessed lower viscosities than suspensions of coarse cocoa powders. Accordingly, these cocoa powders may advantageously be used in the fine fractions of a distribution. In contrast, a fat suspension of a finely ground hexane-extracted cocoa powder, demonstrated a significantly higher viscosity than the suspension of the coarse powder. This cocoa powder may advantageously be used in the coarse fractions of a distribution. Accordingly, pre-determination of the rheological behavior of each of the ingredients used to prepare a desired confectionery or chocolate will provide the basis for selection of the preferred particle size distribution for each ingredient.

The novel chocolates of the present invention are obtained by controlling the particle packing of the solids-containing ingredients by specifically selecting the mean particle size for each ingredient to obtain the desired particle size distribution. The mean particle size of each ingredient (fine to coarse) is selected based upon the rheology of each particle ingredient. The fine sized particles may be composed of any of carbohydrates, cocoa solids-containing ingredients or milk solids-containing ingredients. Preferably, the milk solids-containing ingredients (skim or whole milk) and cocoa solids-containing ingredients should be fine particles. Use of finely ground skim milk solids is most preferred. Finely ground sucrose or other crystalline carbohydrates impart high yield values and should preferably be located in the coarse regions of the distribution. The rheology of fat-suspensions of select cocoa powders have been found to actually improve upon milling of the cocoa powder. These powders may optionally reside in the medium or fine end of the distribution. Cocoa solids-containing ingredients that form suspensions having high yield values and/or viscosity should optionally be located in the coarse or medium regions of the distribution.

Alternatively, the novel chocolates of this invention may be obtained by controlling the particle packing of the solids-containing ingredients by specifically selecting the mean particle size for an ingredient combination that may used in chocolate-making to obtain any desired particle size distribution described herein. As used herein an "ingredient combination" is a mixture of ingredients that has been treated, typically by heating or mixing, to form an ingredient mixture that is used as a single ingredient. The most common example of such an ingredient combination is crumb, which may be composed of a milk solids-containing ingredient and at least one carbohydrate. Crumb may also contain a cocoa solids-containing ingredient such as chocolate liquor or cocoa powder. Crumb may be prepared using conventional ingredients and procedures. According to this invention, different particle size distributions of an ingredient combination, e.g., crumb containing a milk solids-containing ingredient and a carbohydrate, may be obtained and used as needed to obtain a desired overall particle size distribution for the non-fat solids ingredients used to prepare a chocolate. Preparation of specific coarse or fine particle distributions of an ingredient combination may be obtained by selective milling and/or classification. Preferably, the chocolates of this invention that contain ingredients comprising an ingredient combination also contain an emulsifier combination, as described above, as the emulsifying agent.

The key factor for the production of the confectioneries and chocolates of this invention is to provide a blend of solids-containing ingredients having a selected particle size distribution, at the start of the chocolate manufacturing process, to provide a finished chocolate having good rheological characteristics. More importantly, controlling of the particle size distribution of the solids-containing ingredients, at the start of the manufacturing process, minimizes the amount of fat, or cocoa butter, necessary to effectively process the confectionery or chocolate and thereby provides a finished reduced-fat confectionery or chocolate having good rheological characteristics.

Bi-modal and continuous particle size distribution blends of the solids-containing ingredients have been determined to be useful in the present invention to provide the confectioneries and chocolates of this invention having up to 35% by weight total fat, or less, and having a viscosity suitable for enrobing, extruding or moulding operations. Advantageously, use of the bi-modal and continuous particle size distribution blends of the solids-containing ingredients have been found to provide reduced-fat confectioneries and chocolates having about 16% to about 24.5% by weight total fat and having a viscosity suitable for enrobing, extruding or moulding operations. Both particle size distribution methods offer a variety of ways to manipulate particle packing to influence the rheology of the final chocolate.

Bi-modal particle size distributions are selected such that the void spaces between the coarse particles are effectively filled with the fine particles. Accordingly, the bi-modal distribution is selected such that the non-fat particles of the solids-containing ingredients constituting the "coarse particle mode distribution," having a "coarse particle mean size" possess voids that are effectively filled by the particles of the "fine particle mode distribution," that is, ingredients having a "fine particle mean size."

Figure 2:
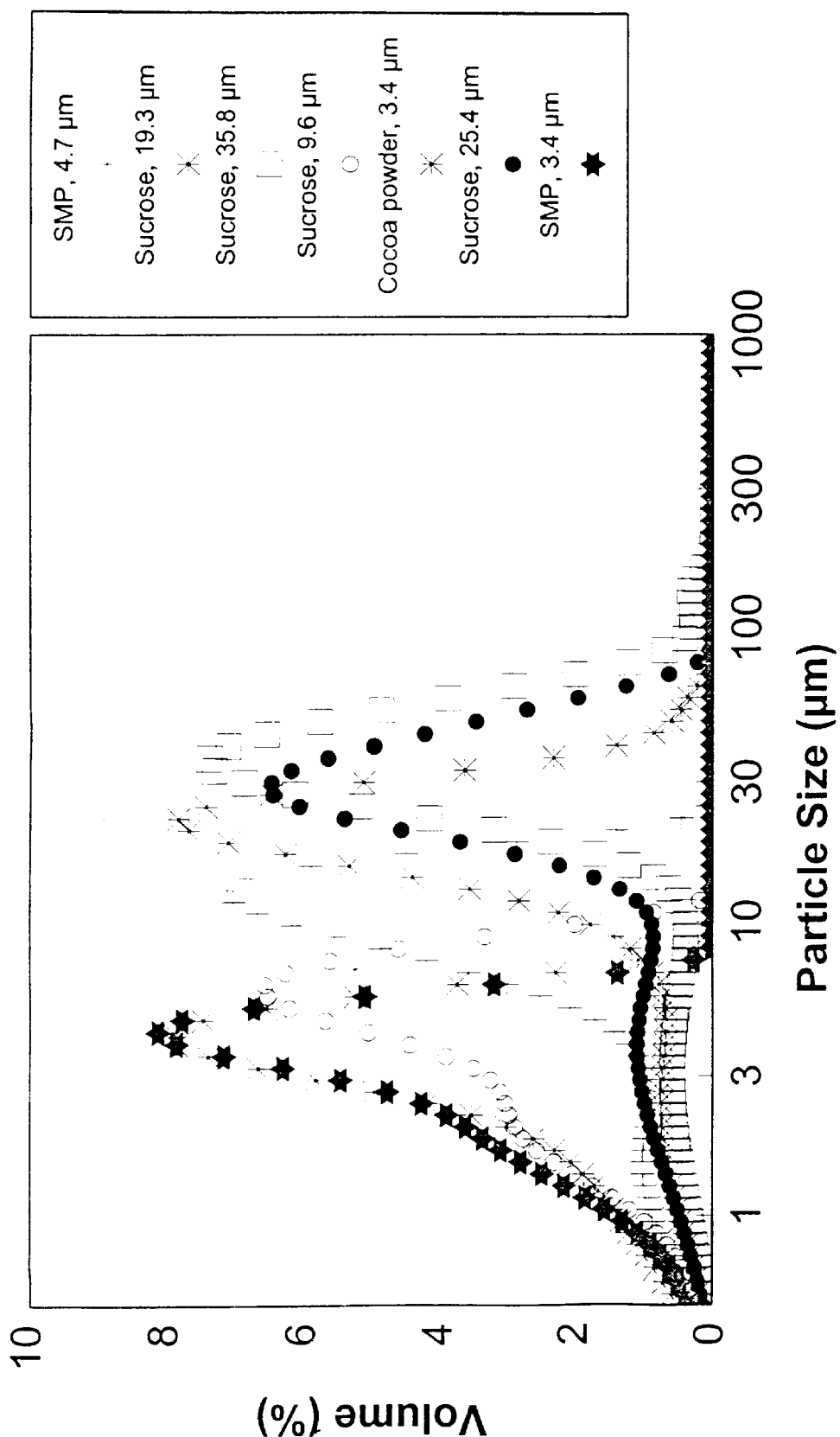
FIG. 2 illustrates the particle size distributions of solids-containing ingredients, obtained by selective milling or milling and classification.
Figure 3:
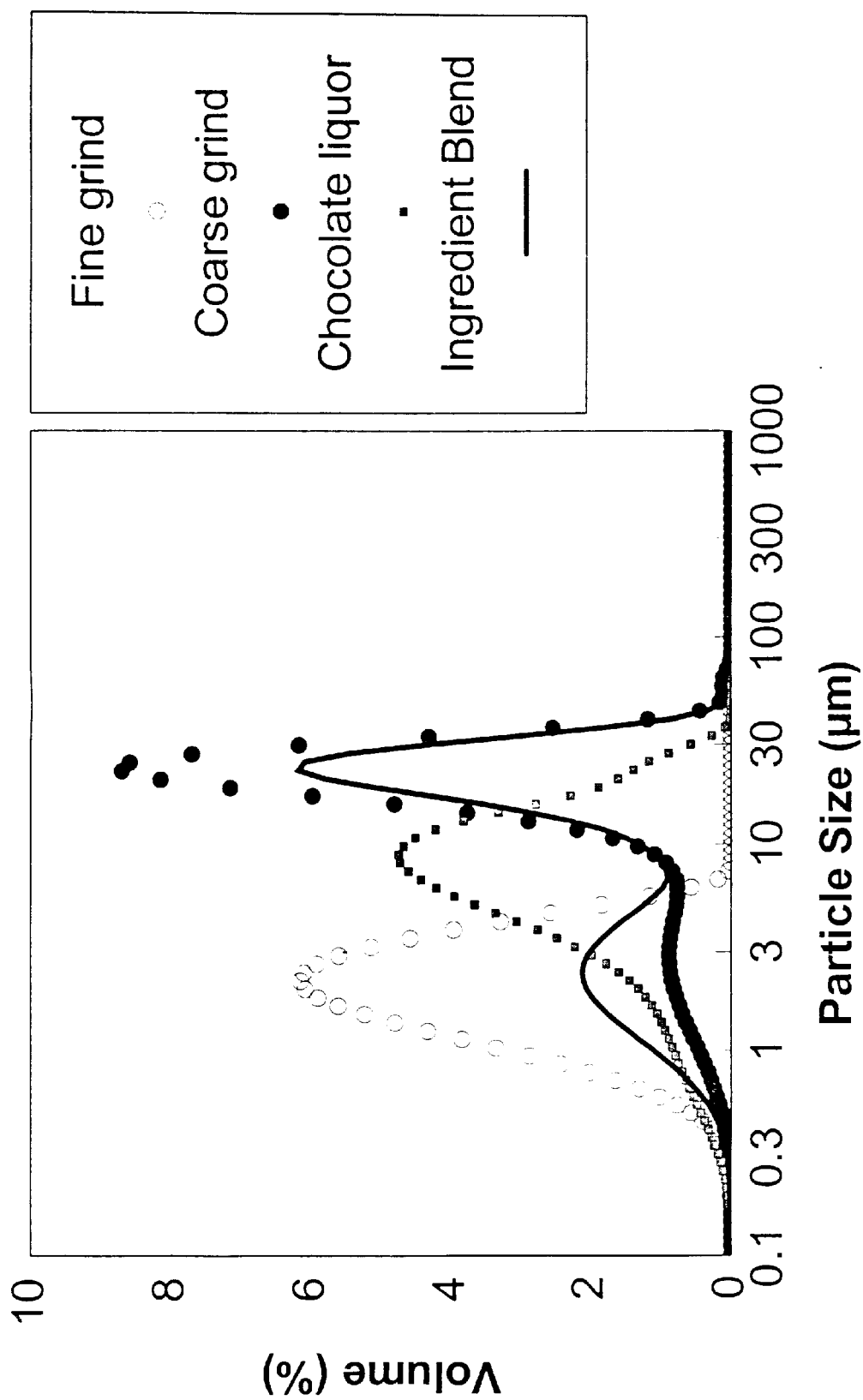
FIG. 3 illustrates a bi-modal particle distribution blend composed of a three components having different particle size distributions.

For the practice of this invention, it is important that the solids-containing ingredients present in the chocolate suspension have particle size distributions that fit into a fine mode distribution and a coarse mode distribution, to provide an overall bi-modal distribution for particles in the suspension. Preferably, this distribution may be obtained by grinding each solids-containing ingredient to a desired mean particle size and particle size distribution and selecting the ingredients, based upon the particle distribution of that ingredient sample and the concentration of that ingredient in the chocolate recipe. Accordingly, by balancing concentration and sample particle distribution, a solids-containing ingredient mixture having a bi-modal particle size distribution may be provided. It is considered within the ordinary skill of one in the art to obtain a desired mean particle size and particle size distribution for an ingredient by selective milling or grinding under conditions which can be conducted and controlled in a known manner, or by selective milling or grinding, followed by refinement of the distribution by sieving or classification. FIG. 2 shows representative particle distributions obtained for a series of solids-containing ingredients. FIG. 3 illustrates a bi-modal particle distribution blend composed of a three component mixture, wherein the components, having different particle size distributions, are combined in a manner described hereinbelow to provide an overall distribution having a coarse and fine mode.

The idealized packing of binary mixtures of particles has been described as a function of both the coarse/fine mean particle size ratio and weight percent composition of the mixture. These parameters define both the quantity and size of voids present between the large particles and the quantity and size of the fine particles required to fill those voids. Accordingly, the size ratio reflects the volume of the voids created by the packing of the fine particles between the coarse particles.

The chocolates of this invention, having rheology suitable for enrobing, moulding or extruding operations may be obtained when the mean particle size of the particles in the coarse particle mode distribution is about 10 microns to about 50 microns and the mean particle size of the particles in the fine particle mode distribution is about 0.5 microns to about 10 microns. Preferably, the mean particle size of the particles in the coarse particle mode distribution is about 10 microns to about 40 microns, and more preferably about 20 microns to about 35 microns. Preferably the mean particle size of the particles in the fine particle mode distribution is about 1 micron to about 7 microns, and more preferably, about 2 microns to about 4 microns.

The chocolates of this invention, having rheology suitable for enrobing, moulding or extruding operations may be obtained when the ratio of the mean particle size of the particles of the coarse particle mode distribution to the mean particle size of the particles of the fine particle mode distribution is greater than about 5:1 (coarse:fine). Preferably, the ratio of coarse:fine mean particle is in the range of about 5:1 to about 11:1, and more preferably, the ratio is about 6:1 to about 7:1.

The chocolates of this invention, having rheology suitable for enrobing, moulding or extruding, may be obtained when the weight percent of the coarse particles, having a selected coarse particle mean size, comprise about 50% to about 80% by weight of the total weight of the solid ingredients (on a de-fatted basis). Conversely, the chocolates of this invention, having rheology suitable for enrobing, moulding or extruding, may be obtained when the weight percent composition of the fine particles, having a selected fine particle mean size, comprise about 20% to about 50% by weight of the total weight of the solids-containing ingredients.

It has been discovered that the preferred distribution of coarse and fine particles may depend upon the emulsifying agent used in the preparation of the chocolate compositions of this invention. For example, when any single emulsifying ingredient is used as the emulsifying agent (e.g., lecithin or any other suitable emulsifying ingredient used as a sole emulsifying agent) the reduced-fat chocolates of this invention may preferably be prepared having the weight percent composition of the coarse particles comprise about 60% to about 80% by weight of the total weight of the solid ingredients; more preferably, the coarse particles comprise about 70% to about 80% by weight of the total weight of the solid ingredients; most preferably, the coarse particles comprise about 75% by weight of the solids-containing ingredients, on a non-fat basis. However, when the emulsifying agent is an emulsifier combination, as described above (e.g., a combination of lecithin and polyglycerol polyricinoleate), the reduced-fat chocolates of this invention may preferably be prepared having the weight percent composition of the coarse particles comprise about 50% to about 80% by weight of the total weight of the solid ingredients; more preferably, the coarse particles comprise about 50% to about 70% by weight of the total weight of the solid ingredients; most preferably, the coarse particles comprise about 50% to about 60% by weight of the solids-containing ingredients, on a non-fat basis. Conversely, when any single emulsifying ingredient is used as the emulsifying agent (e.g., lecithin or any other suitable emulsifying ingredient used as a sole emulsifying agent) the reduced-fat chocolates of this invention may preferably be prepared having the weight percent composition of the fine particles comprise about 20% to about 40% by weight of the total weight of the solid ingredients; more preferably, the fine particles comprise about 20% to about 30% by weight of the total weight of the solid ingredients; most preferably, the fine particles comprise about 25% by weight of the solids-containing ingredients, on a non-fat basis. However, when the emulsifying agent is an emulsifier combination, as described above, the reduced-fat chocolates of this invention may preferably be prepared having the weight percent composition of the fine particles comprise about 20% to about 50% by weight of the total weight of the solid ingredients; more preferably, the fine particles comprise about 30% to about 50% by weight of the total weight of the solid ingredients; most preferably, the fine particles comprise about 40% to about 50% by weight of the solids-containing ingredients, on a non-fat basis. Accordingly, the method of this invention provides for the preparation of chocolate compositions having a high concentration of fine sized particles (as high as about 50%) that possess rheology desirable for enrobing, moulding or extruding.

Understanding of the rheological behavior of fine particles of the solids-containing ingredients permits ingredient mode selection. That is, the present inventors have identified those specific ingredients that may be present in a suspension as fine particles, and thus occupy the fine particle mode distribution, without adversely effecting the rheology of the suspension. Accordingly, for the chocolates of the present invention prepared having a bi-modal particle distribution blend, the composition of ingredients in the fine particle mode distribution, having a selected fine particle mean size, may be selected from the group consisting of cocoa solids-containing ingredients, milk solids-containing ingredients, carbohydrates, such as sucrose, or ingredient combinations thereof, such as crumb. More preferably, the milk solids-containing ingredients and cocoa solids-containing ingredients have fine particle sizes. For example, for a given chocolate recipe, the fine particles may be composed of cocoa solids-containing ingredients and milk solids-containing ingredients, at approximately equal concentrations (e.g. at about 8% by weight each), while the concentration of the carbohydrate, sucrose, may be varied, as needed, to fill-in the percentage of fine particles. The remainder of the sucrose may be used as larger particles, to have the selected coarse particle mean size.

Accordingly, when the ingredient composition of the fine particle mode distribution is selected, as described above, the reduced-fat chocolates of this invention, having rheology desirable for enrobing, moulding or extruding operations may be preferably obtained when the weight percent composition of the fine particles is about 20% to about 50% by weight of the total weight of the solids-containing ingredients. This distribution, however, will be recipe dependent and is determined by the balance between particle packing and ingredient interaction.

Conversely, the reduced-fat chocolates of this invention may be obtained when ingredient selection is used to select the composition of the coarse particles having a selected coarse particle mean size such that the weight percent composition of the coarse particles is preferably at about 50% to about 80% by weight of the total weight of the solids-containing ingredients. The ingredients present in the coarse particle mode distribution, having a selected coarse particle mean size, may preferably be selected from any of cocoa solids-containing ingredients, milk solids-containing ingredients, carbohydrates, such as sucrose, and ingredient combinations thereof, such as crumb. More preferably the coarse particles are composed of crystalline carbohydrate sweeteners. Spray-dried milk solids in the coarse fraction are preferably densified prior to use.

The present invention also relates to a method for preparing chocolates suitable for enrobing, extruding moulding or other forming techniques, comprising the steps of:

(i) providing a mixture of solid ingredients used in the preparation of chocolates, said mixture comprising particles having a bi-modal particle size distribution comprising a fine particle mode distribution and coarse particle mode distribution, wherein-the fine particle mode distribution is comprised of solid ingredient particles having a mean particle size in the range of about 0.5 microns to about 10 microns, and the coarse particle mode distribution is comprised of ingredient particles having a mean particle size in the range of about 10 microns to about 50 microns, wherein the concentration of particles in the fine particle mode distribution is about 20% to about 50% by weight of the total weight of the non-fat solids, the concentration of particles in the coarse particle mode distribution is about 50% to about 80% by weight of the total weight of the non-fat solids and the ratio of the mean particle size of the coarse particles to the mean particle size of the fine particles is greater than 5.5:1 (coarse/fine);

(ii) conching the bi-modal non-fat solid mixture with fat to form a chocolate suspension, wherein the fat may include cocoa butter, milk fat or a fat substitute, and the fat comprises about 15.5% to about 34.5% by weight of the total weight of the chocolate suspension; and (iii) blending the chocolate suspension with an emulsifier or a combination of emulsifiers to form a chocolate, having a total fat content of about 16% to about 35% by weight of the total weight of the chocolate, and having a Casson viscosity of less than 200 poise, a Casson yield value less than 1000 dynes/cm$^2$, and a micrometer particle size less than 50 microns.

Preferably, the chocolates of the present invention are prepared according to the above-described method, wherein the fine particle mode distribution is comprised of solids-containing ingredients having a mean particle size in the range of about 1 micron to about 7 microns; the coarse particle mode distribution is comprised of solids-containing ingredients having particles with a mean particle size in the range of about 20 microns to about 35 microns; the concentration of particles in the fine particle mode distribution is about 20% to about 30% by weight of the total weight of the solids-containing ingredients; the concentration of particles in the coarse particle mode distribution is about 70% to about 80% by weight of the total weight of the solids-containing ingredients; the ratio of the mean particle size of the coarse particles to the mean particle size of the fine particles is about 5.5:1 to about 11:1 (coarse/fine); the Casson yield value less than 200 dynes/cm$^2$; the Casson viscosity less than 100 poise; and the micrometer particle size of the finished chocolate is less than 40 microns.

More preferably, the chocolates of the present invention are prepared according to the above-described method, wherein the fine particle mode distribution is comprised of solids-containing ingredients having a mean particle size in the range of about 2 microns to about 4 microns; the coarse particle mode distribution is comprised of solids-containing ingredients having particles with a mean particle size in the range of about 20 microns to about 35 microns; the ratio of the mean particle size of the coarse particles to the mean particle size of the fine particles is about 6:1 to about 7:1 (coarse/fine); the Casson yield value less than 200 dynes/cm$^2$; the Casson viscosity less than 80 poise; and the micrometer particle size is less than 30 microns.

Even more preferably, the chocolates of the present invention are prepared according to the above-described methods further comprising selecting the composition of the solids-containing ingredients having a mean particle size of less than about 5 microns from the group consisting of carbohydrates, cocoa solids-containing ingredients and milk solids-containing ingredients, preferably selected from cocoa solids-containing ingredients and milk solids-containing ingredients, and selecting the composition of the solids-containing ingredients having a particle size of greater than about 10 microns from the group consisting of carbohydrates, cocoa solids-containing ingredients and milk solids-containing ingredients.

Most preferably, the chocolates of the present invention are prepared according to the above-described methods, further comprising selecting the composition of the solids-containing ingredients having a particle size of less than about 5 microns from the group consisting of milk solids;

selecting the composition of the solids-containing ingredients having a particle size of greater than about 10 microns from the group consisting of carbohydrates.

Alternatively, the chocolates of the present invention may be prepared according to the above-described methods to have a Casson viscosity less than 30 poise and a Casson yield value less than 200 dynes/cm², or to have a Casson viscosity less than 50 poise and a Casson yield value less than 150 dynes/cm², or to have a Casson viscosity less than 60 poise and a Casson yield value less than 100 dynes/cm², or to have a Casson viscosity less than 40 poise and a Casson yield value less than 100 dynes/cm².

Advantageously, the present invention also relates methods for preparing reduced-fat chocolates suitable for enrobing, extruding or moulding, using any of the above-described methods, wherein the total fat content of the chocolate suspension is about 15.5% to about 24% by weight of the total weight of the chocolate suspension, and the total fat content of the finished chocolate, formed after blending the chocolate suspension and emulsifier, is about 16% to about 24.5% by weight of the total weight of the chocolate.

Use of the bi-modal particle distribution method of the present invention may provide a processing advantage. Although this may not be a general phenomena, it was observed that the chocolate mixtures having bi-modal ingredient blends "transition" very rapidly. That is, the mixtures change from a solid state, having a flake or crumb texture, to a partially liquid state, i.e., a paste, within 60 minutes of conching. To ensure proper flavor development during conching and delay the onset of "transition", the fat concentration of the bi-modal blends may optionally be reduced to below 18% total fat, by weight. A reduced-fat chocolate having a total fat concentration as low as 17.2% by weight, prepared according to the bi-modal distribution/ingredient mode selection method described above, possessed a Casson viscosity of 139 poise and Casson yield value of 41.5 dynes/cm². Accordingly, by combining the bi-modal particle size distribution method and ingredient mode selection method of the present invention, reduced-fat chocolates having low total fat concentrations, and possessing desirable rheological characteristics may be prepared.

Alternatively, a continuous particle size distribution may be selected for the non-fat particles to provide another chocolate of this invention having good rheological characteristics. The ideal particle size distribution of a crowded suspension, according to Equation (1), provides a non-undulating size distribution of particles which permits closer packing of more solid particles in a specific volume of carrier or emulsifier, than can be achieved with a particle size distribution which has an undulating distribution of particles.

$$\frac{CPFT}{100\%} = \frac{D^n - D_s^n}{D_L^n - D_s^n} \qquad \text{Eqn. (1)}$$

$D_L$=the diameter size of the largest particle in the distribution $D_s$=the diameter size of the smallest particle in the distribution D=a selected particle size in the distribution n=about 0.2 to about 0.7

Figure 4:
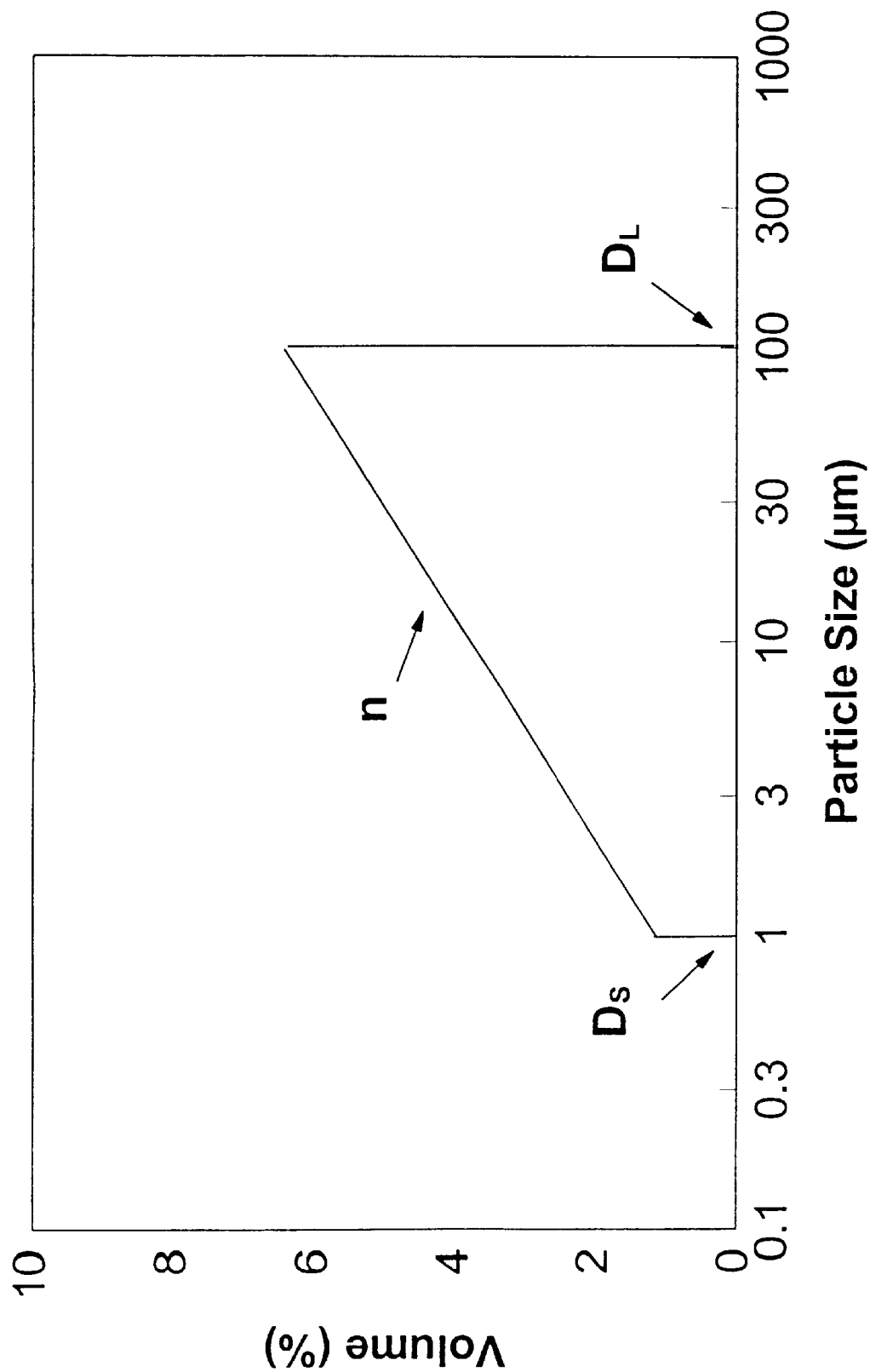
FIG. 4 illustrates the theoretical distribution of particles, by size, having a continuous particle size distribution.

The term "CPFT particle size distribution" as used herein in relation to chocolate particles means a "CPFT chart" representative of the particle size distribution of the solids-containing ingredients, on a non-fat basis. For example, when CPFT is plotted against particle size as a histogram of percent volume against particle size, e g. in microns ($\mu$m), FIG. 4, a smooth line is formed. The "CPFT chart" may be straight or curved and may have a slope n, of up to 1.0, but should be substantially free of peaks and valleys, referred to herein as "inflections" or "undulations." The presence of such inflection are indicative of irregularities in the content or amounts of the various ingredient particle sizes required to obtain a fully continuous distribution.

Preferably, the CPFT chart plot as a histogram representation should be a smooth, or substantially "non-undulating", line from $D_s$ to $D_L$. A "non-undulating line" is defined herein as a CPFT graph of which the slope of a tangent at any point on the chart line is within the upper and lower values for n. Small undulations, within these outer limits for n may be tolerated. Large undulations may render the chocolate unsuitable for pumping especially at high concentrations, e.g. over 80% by weight solids (less than 20% fat). The particle size distribution of the solids-containing ingredients in the chocolate depicted by the non-undulating line of the chart will correlate with a "smooth" distribution of particles of sizes ranging from $D_L$, the diameter size of the largest particle in the distribution, to $D_s$, the diameter size of the smallest particle in the distribution.

The sizes of $D_L$ and $D_s$ have particularly important effects on the suitability of the particle size distribution for use in a chocolate suspension. When $D_L$ is too large, the chocolate may have a grainy texture. When $D_s$ is too large, and when less than about 5% by weight of the particles are 3 microns or less, the stability of the yield stress and the rheological properties of the chocolate may be adversely affected. The value of the numerical exponent n in the formula CPFT is affected by the values of $D_L$ and $D_s$. To prepare the chocolates of the present invention, n may range from about 0.2 to about 0.7, preferably, n may be about 0.29 to about 0.5, and more preferably, n may be about 0.32 to about 0.45; $D_L$ may be in the range from about 30 microns to about 100 microns and, preferably, may be about 40 microns to about 80 microns, and more preferably may be about 60 microns; $D_s$ may be less than about 0.5 microns and may be in the range of about 0.3 microns to about 0.05 microns, and preferably may be about 0.1 micron.

Figure 5:
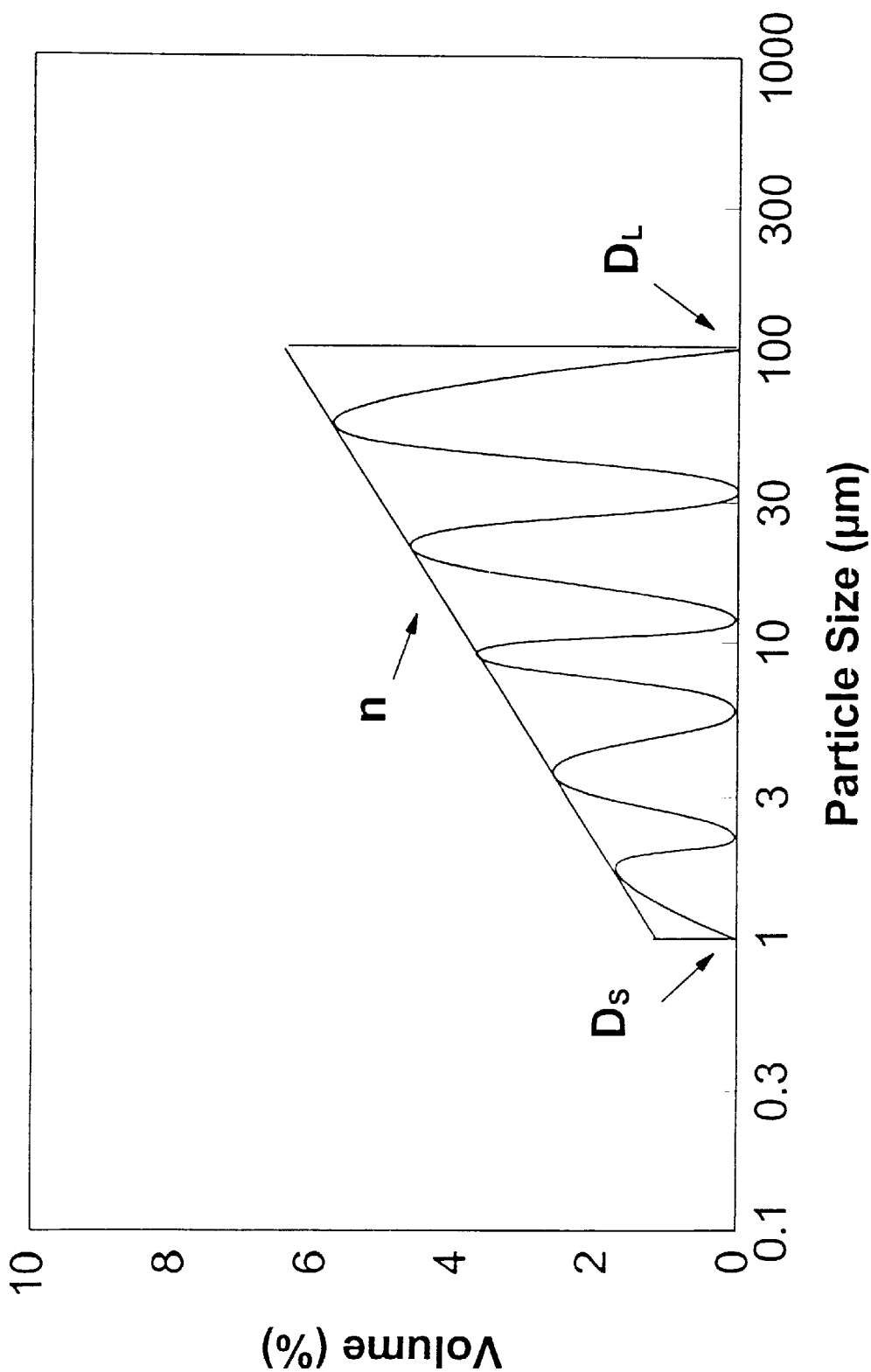
FIG. 5 illustrates an idealized suspension of an overall particle size distribution having continuous distribution formula.
Figure 6:
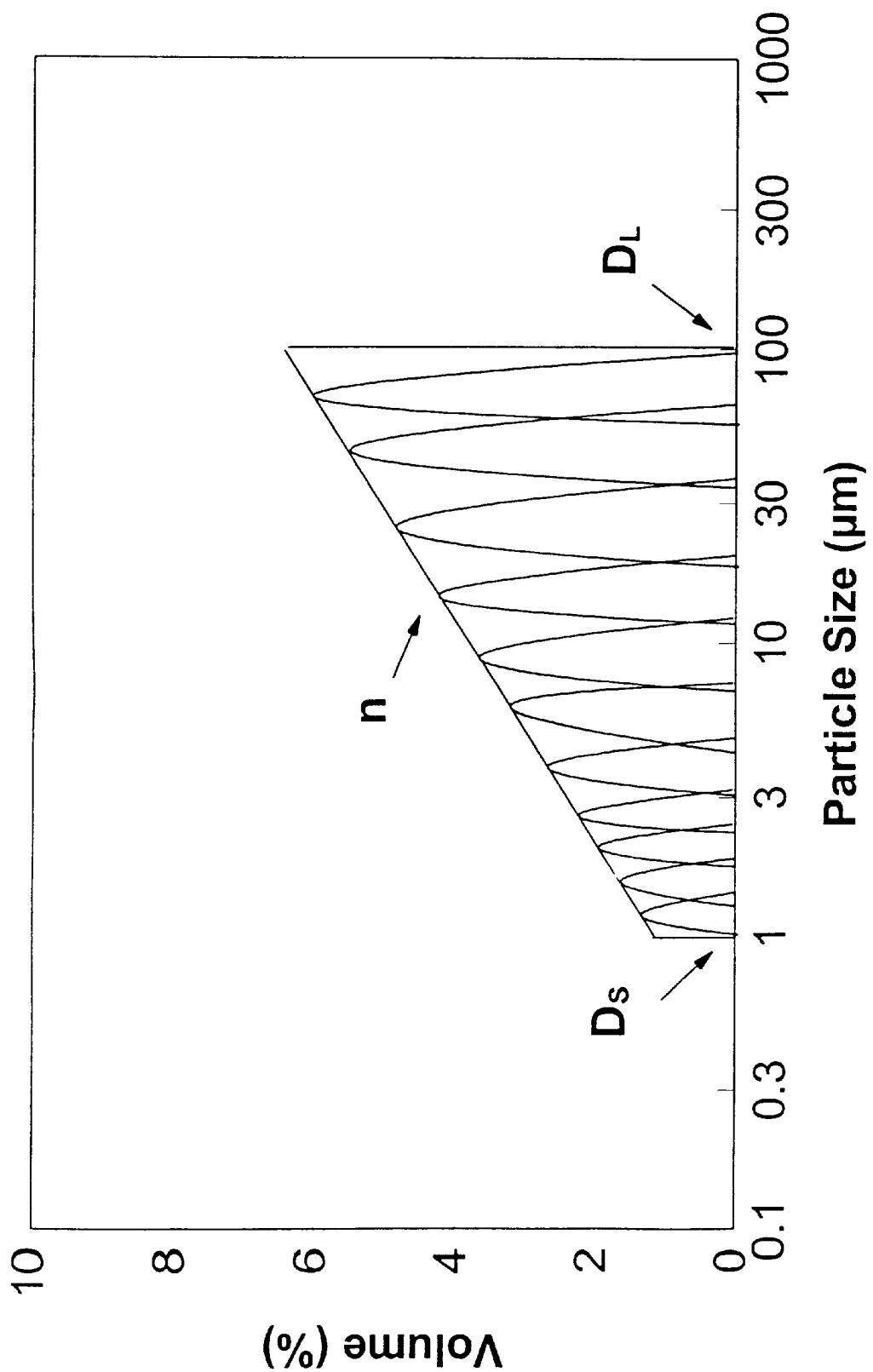
FIG. 6 illustrates the effect of increasing the number of milled ingredients and distributions on the approximation of the continuous particle size distribution, according to Equation 1.

For the practice of this invention, it is important that the solids-containing ingredients present in the chocolate suspension have an overall particle size distribution as close as possible to the continuous distribution formula, above. Preferably, this distribution may be obtained by providing each solids-containing ingredient, or an ingredient combination of solids-containing ingredients (e.g. crumb), at a desired mean particle size and particle size distribution and selecting the ingredients used to prepare the chocolate, based upon the particle distribution of that ingredient sample and the concentration of that ingredient in the chocolate recipe. This distribution may be obtained by providing the solid ingredients as a set of milled, and/or classified ingredients having a set of particle size distributions having mean particle sizes within $D_L$ and $D_s$. FIG. 5 illustrates an idealized suspension having an overall particle size distribution that is very close to the continuous distribution formula, wherein each distribution illustrated corresponds to a milled ingredient distribution. Advantageously, increasing the number of milled ingredients and distributions improves the approximation of the continuous distribution, providing a better fit to the Equation 1 (FIG. 6). Preferably, multiple milled ingredient distributions are provided for a single ingredient or an ingredient combination, e.g., two sucrose grinds or two crumb grinds, having mean particle sizes of 9.6 microns and 25.4 microns. A continuous particle distribution is obtained from a set of milled ingredients by mixing a selected amount of each ingredient, having a particular particle size distribution. The select amount of each ingredient distribution is determined by calculating the best fit to Equation 1. The best fit to this equation provides an overall distribution having the densest packing or the lowest porosity (i.e., void space) between the particles comprising the distribution. The amount of each particular milled ingredient, in a set of ingredients, required to satisfy the equation may be determined according to the methods disclosed in U.S. Pat. Nos. 4,282,006 and 4,477,259, or computationally. The best fit may be determined computationally using a predictive process control (PPC) computer program described by Dinger and Funk, in *Predictive Process Control of Crowded Particulate Systems Applied to Ceramic Manufacturing*, (Kulwer Academic Publishers, 1994). The composition of the ingredient mix was determined computationally using the MIX10 program (available from D. Dinger, Clemson University) by maintaining the concentration of the chocolate liquor having a mean particle size of 10.1 microns at 13.9% by weight of the chocolate (8% by weight of the total non-fat solids content of the chocolate). The concentration of the remaining ingredient distributions was adjusted by the MIX10 program to obtain densest packing. Accordingly, a chocolate having a continuous particle size distribution, wherein n=0.37 was obtained.

Accordingly, by balancing concentration and sample particle distribution, a solids-containing ingredient mixture having a continuous particle size distribution may be provided. It is considered within the ordinary skill of one in the art to obtain a desired mean particle size and particle size distribution for an ingredient by selective milling or grinding under conditions which can be conducted and controlled in a known manner, or by selective milling or grinding, followed by refinement of the distribution by sieving or classification. Roll refiners may also be used to obtain the desired size reduction of the solids-containing ingredients. Alternatively, a controlled crystallization form of sugar, from a supersaturated solution of sugar, or a sugar post-treatment process (as disclosed in U.S. Pat. No. 5,464,649) may also be used to provide sugar samples with different particle shapes and/or size distributions.

Accordingly, based on the above-described rheological behavior of the ingredients used herein, in the chocolates of the present invention, the composition of the particles of the continuous particle size distribution blend, ranging in size from about 0.05 microns to about 30 microns (fine size), may be selected from cocoa solids-containing ingredients, milk solids-containing ingredients, carbohydrates, such as sucrose, or an ingredient combination thereof. Preferably, these fine sized components may be selected from cocoa solids-containing ingredients and milk solids-containing ingredients. The coarse particle sized components, ranging in size from about 30 microns to about 100 microns, may be composed of any ingredients or ingredient combination used to prepare the chocolate, but are preferably crystalline carbohydrate sweeteners. Coarse-sized spray-dried milk solid particles are preferably densified prior to use. Blending of the different particulate ingredients provides a mixture having the $D_L$, $D_s$ and particle size distribution in desired n range for the chocolate, with a maximum solids content and with minimum void volume (defined as volume between particles). The chocolates, prepared according to the continuous particle size distribution formula, possess a lower fat content and a lower viscosity than is possible for chocolates prepared through conventional chocolate processing (i.e. roll refining or dry milling of ingredient combinations without particle size distribution control).

The present invention also relates to a method for preparing chocolates suitable for enrobing, extruding moulding, or other forming techniques, comprising:

(i) providing a mixture of solids-containing ingredients used in the preparation of chocolate comprising finely-divided particles having a continuous distribution of particles having particle sizes in the range of about 0.05 microns to about 100 microns with at least 5% by weight of the particles having a particle size of less than 3.0 microns, wherein the continuous particle size distribution is substantially in accordance with equation (1) wherein n may be about 0.2 to about 0.7, $D_L$ may be about 30 microns to about 100 microns, and $D_s$ may be less than about 0.5 microns;

(ii) conching the mixture with fat to form a chocolate suspension, wherein the fat may include cocoa butter, milk fat or a fat substitute, and the fat comprises about 15.5% to about 34.5% by weight of the total weight of the chocolate suspension; and (iii) blending the chocolate suspension with an emulsifier or a combination of emulsifiers to form a chocolate, having a total fat content of about 16% to about 35% by weight of the total weight of the chocolate, and having a Casson viscosity of less than 200 poise, a Casson yield value less than 1000 dynes/cm$^2$, and micrometer particle size less than 50 microns.

Preferably, the present invention also relates to a method for preparing chocolates having a smooth, fat-like texture suitable for enrobing, extruding or moulding, according to the above-described method wherein $D_L$ may be about 40 microns to about 80 microns and $D_s$ may be about 0.05 microns to about 0.3 microns.

Preferably, the chocolates of the present invention are prepared according to the above-described methods, further comprising selecting the composition of the solids-containing ingredients having a mean particle size of less than about 20 microns from the group consisting of carbohydrates, cocoa solids-containing ingredients, milk solids-containing ingredients or ingredient combinations thereof, preferably, the cocoa solids-containing ingredients and milk solids-containing ingredients have fine particle sizes, and selecting the composition of the solids-containing ingredients having a mean particle size of greater than about 20 microns from the group consisting of carbohydrates, cocoa solids-containing ingredients and milk solids-containing ingredients, or ingredient combinations thereof.

Most preferably, the chocolates of the present invention are prepared by the above-described methods, further comprising selecting the composition of the solids-containing ingredients having a mean particle size of less than about 15 microns from the group consisting of milk solids; selecting the composition of the solids-containing ingredients having a mean particle size of greater than about 30 microns from the group consisting of carbohydrates.

Preferably the chocolates of the present invention prepared using solids-containing ingredients, having a continuous particle size distribution, according to any of the above-described methods have a Casson viscosity of less than 200 poise and a Casson yield value less than 200 dynes/cm$^2$. Alternatively, the chocolates of the present invention may be prepared using the above-described methods, to have a Casson viscosity of less than 80 poise and a Casson yield value less than 200 dynes/cm$^2$ or to have a Casson viscosity less than 30 poise and a Casson yield value less than 200 dynes/cm², or to have a Casson viscosity less than 50 poise and a Casson yield value less than 150 dynes/cm², or to have a Casson viscosity less than 60 poise and a Casson yield value less than 100 dynes/cm², or to have a Casson viscosity less than 40 poise and a Casson yield value less than 100 dynes/cm².

Advantageously, the present invention also relates to a method for preparing reduced-fat chocolates suitable for enrobing, extruding or moulding, prepared using solids-containing ingredients, having a continuous particle size distribution, according to any of the above-described methods, wherein the total fat content of the chocolate suspension is about 15.5% to about 24% by weight of the total weight of the chocolate suspension, and the total fat content of the finished chocolate, formed after blending the chocolate suspension and emulsifier, is about 16% to about 24.5% by weight of the total weight of the chocolate.

Figure 7:
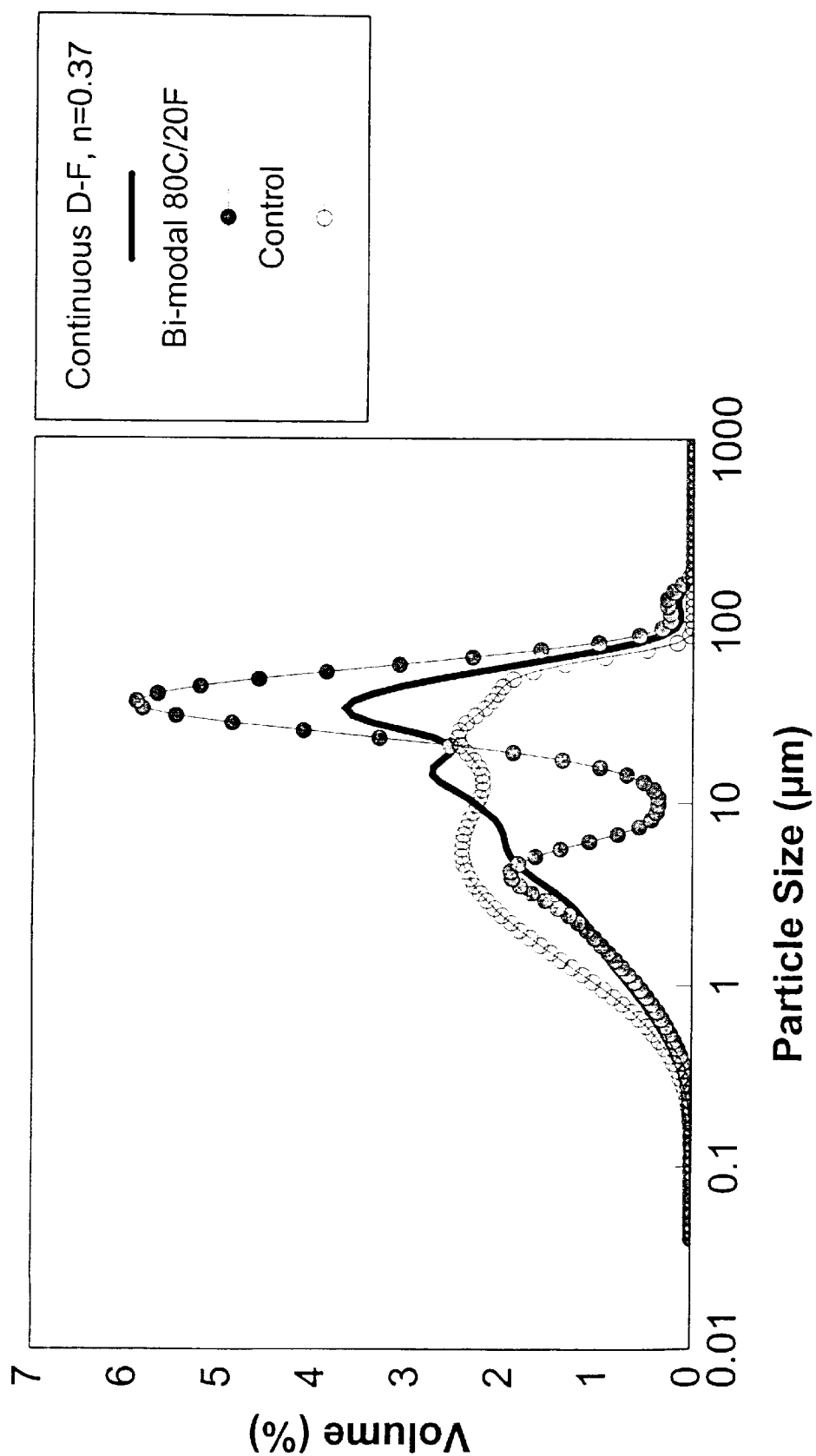
FIG. 7 illustrates the comparison of three different particle distributions: a particle distribution of a chocolate produced using conventional technology (i.e., three roll refiner), a bi-modal particle size distribution (80% by weight coarse particles) and a continuous particle size distribution (n=0.37).

Reduced-fat chocolates of the present invention may be obtained using either of the above-described particle size distributions, i.e., discrete bi-modal distribution or continuous distribution, in combination with ingredient mode selection. The choice of using one distribution over the other may be made on the basis of the intended use of the chocolate (i.e., as an enrobing chocolate or extruded chocolate), the recipe used to prepare the chocolate, and the properties of the particular ingredients selected (i.e., type of cocoa-containing ingredients or sweetener and the relative ease of obtaining each distribution). FIG. 7 illustrates the comparison of three different particle distributions: a particle distribution of a chocolate produced using conventional technology (i.e. three roll refiner), a bi-modal particle size distribution (80% by weight coarse particles) and a continuous particle size distribution (n=0.37). Typically, for any chocolate recipe, a sample chocolate may be prepared using both the bi-modal and continuous particle distributions, described above, and a determination made as to which of the resulting chocolates provides the desired properties for the desired operation. In practice, the yield values for the reduced-fat chocolates of this invention are typically lower for chocolates prepared having continuous particle size distributions than for chocolates prepared having bi-modal particle size distributions.

The confectioneries and chocolates of this invention, prepared using either a bi-modal or continuous particle distribution, may be provided having any of the different rheologies, as specified above. Rheological modification of the confectioneries and chocolates may be accomplished by ingredient replacement (cocoa powder for chocolate liquor, skim milk powder for whole milk powder), changing recipe (reduction in cocoa solids concentration and increase in dairy solids concentration), use of emulsifying agents or emulsifying agent combinations, as described above, or use of seeding agents. Tempering is a commonly used process in chocolate manufacturing wherein a fraction of the fat crystallizes. This crystallization process simultaneously increases the solids content of the chocolate and reduces the liquid fat content, which increases the viscosity of the chocolate as crystallization proceeds. The use of a precise, low concentration of an effective seeding agent may reduce the viscosity of tempered chocolates and may be useful to modify the rheology of the chocolates of this invention.

The Examples which follow are intended as an illustration of certain preferred embodiments of the invention, and no limitation of the invention is implied.

EXAMPLE 1

A fine grind fraction (3–6 micron mean particle size) of each ingredient was produced using an air-jet mill, such as a ROTO-JET (sold by Fluid Energy Aljet, Inc. Plumsteadville, Pa., an AIR JET PULVERIZER, sold by Nisshin Engineering Co., Ltd., Buffalo Grove, Ill.) or a MICRON MASTER JET PULVERIZER, sold by Jet Pulverizer Co., and the like. Individual powders were analyzed by laser light scattering using a Coulter LS230 particle size analyzer, (sold by Coulter Corporation, Hialeah, Fla.). Suspensions containing 40% by weight of the fine grind of each ingredient were prepared by mixing the ingredient sample with cocoa butter for 6 hours. The Casson plastic viscosity and yield value for each sample is reported in Table 1. The coarse fractions are commercial cocoa powders as received from the vendor.

TABLE 1

| | | FINE GRIND | | AS RECEIVED | |
| --- | --- | --- | --- | --- | --- |
| Powder Type | Identity | Casson Plastic Viscosity (Poise) | Casson Yield Value (dynes/cm²) | Casson Plastic Viscosity (Poise) | Casson Yield Value (dynes/cm²) |
| Cocoa | Commercial Defatted Cocoa Powder #1 (hexane-containing) | 100 | 41 | 25 | 3 |
| Cocoa | #2 Defatted powder | 88 | 62 | 151 | 161 |
| Cocoa | #3 Defatted powder | 64 | 72.4 | 68 | 41 |
| | #4 10–12% fat powder | 65 | 494 | 126 | 142 |
| Carbohydrate | Powdered sucrose 10X | 46 | 60 | | |
| | Lactose | 21 | 126 | | |
| Dairy | Skim milk powder | 35 | 5 | | |

EXAMPLE 2

A base chocolate, having 20.3% total fat and a micrometer particle size of 29 microns, was prepared using the following recipe:

| Ingredient (% by wt) | |
| --- | --- |
| Sucrose (10x) | 66.4 |
| Skim milk powder | 7.2 |
| Chocolate liquor | 13.9 |
| Anhydrous Milk Fat | 4.7 |
| Cocoa butter | 7.3 |
| Soy lecithin | 0.5 |
| | 100% |

The base chocolate was prepared by mixing the above-listed ingredients in Littleford Day model 5 plough mixer, manufactured by Littleford Day, Inc. Florence, Ky.) at a speed setting of '4' for 10 hours. Prior to mixing, each of the ingredients was independently milled to provide a set of ingredient distributions. Sucrose was classified into two "grind" fractions using a CCE model Centrifugal Classifier (sold by CCE, Inc., Minneapolis, Minn.). When formulating samples having selected particle size distributions, the relative concentration of only the non-fat solid components if each ingredient is considered. When determining the relative concentration of fat and non-fat solid components, the non-fat solids in lecithin and the small amount of fat in the skim milk powder are not considered (that is, all of the lecithin (0.5 wt %) is considered a fat component and all of the skim milk powder is considered a non-fat component). Adjusting the above recipe to a fat-free basis provided the following:

| | Mean size ($\mu$m) | Weight % (solids) |
| --- | --- | --- |
| Sucrose Grind 1 | 25.4 | 58 |
| Sucrose Grind 2 | 9.6 | 25 |
| Chocolate liquor | 10.1 | 8 |
| Skim Milk Powder | 3.4 | 9 |
| | | 100% |

Emulsifier combinations of 0.5% by wt soy lecithin with each of sucrose polyerucate, ammonium phosphatide, polyglycerol polyricinoleate, PMD/DATEM, and fractionated lecithin (40% phosphatidylcholine) were prepared by combining a 500–600 gram portion of the base chocolate, prepared above, and 0.1% by weight of a test emulsifier (PGPR was added in 0.05% by wt portions) in a 60° C. water-jacketed KitchenAid Professional model mixer equipped with an anchor agitator and mixing at speed setting '6' for 30 minutes. The rheology (plastic viscosity and yield value) of the resulting chocolate containing the emulsifier mixture was then determined. Rheology values of Casson yield and plastic viscosity were derived from flow curves using a TA Instruments AR1000 rheometer with a 4 cm diameter 4° cone/plate geometry. The following conditions, as described in U.S. Pat. No. 5,464,469, were used for measuring the chocolate samples: pre-shear stress of 0 dynes/cm$^2$, pre-shear time of 0 minutes, and equilibration time of 1 minute. The experiment mode of shear rate sweep was done at 40° C. starting at 0 sec$^{-1}$ ending at 9 sec$^{-1}$ using a linear rate mode. The ascent time was 8 min. with no hold time at maximum stress followed by an 8 min. descent time. Casson values from the 'up' and 'down' curves were averaged and reported. Additions of emulsifier and mixing for 30 minute intervals were continued until the rheology of the chocolate stabilized (i.e., flow curves remain unchanged). The optimum emulsifier concentration reported in Table 2 reflects the amount of test emulsifier added to the specific base chocolate of this example (containing 0.5% by wt lecithin) that provided a chocolate having combined lowest plastic viscosity and yield value. The specific base chocolate of this example had a plastic viscosity of 54.9 poise and a Casson yield value of 92.1 dynes/cm$^2$. PGPR, used in combination with lecithin, may provide a range of yield values between 0 and 92 dynes/cm$^2$ depending on PGPR concentration.

TABLE 2

| TEST EMULSIFIER ADDED TO BASE CHOCOLATE | MANUFAC- TURE | Test Emulsifier Concentration (wt %) | Plastic Viscosity (Poise) | Yield Value (dynes/ cm$^2$) |
| --- | --- | --- | --- | --- |
| Sucrose polyerucate | Mitsubishi Chemical | 1.0% | 33.8 | 53.5 |
| PMD/DATEM* | Quest Int'l | 0.4% | 44.4 | 116.9 |
| Fractionated lecithin# | Central Soya | 0.1% | 45.3 | 159.1 |
| PGPR+ | Quest Int'l | 0.5% | 96.4 | 0 |
| Ammonium Phosphatides | Palsgaard | 0.3% | 54.7 | 104.9 |

*Phosphated mono-diglycerides/Diacetyl tartaric acid of mono glycerides
Nathin 140
+Polyglycerol Polyricinoleate

EXAMPLE 3

Five samples of reduced-fat chocolate, having bi-modal particle size distributions, were prepared by blending of selected ingredients, according to the following recipe:

| Ingredient | Weight % |
| --- | --- |
| Sucrose (10X, Confectioners Sugar) | 67.1 |
| Skim milk powder | 6.4 |
| Defatted alkalized cocoa powder | 6.4 |
| Cocoa butter | 16.0 |
| Anhydrous milk fat (AMF) | 3.6 |
| Soy lecithin | 0.5 |
| | 100% |

Total fat = 200% by weight

Five particle size distributions of sucrose (10x) were produced and analyzed, according to Example 1, with mean particle sizes between about 3.7 and about 35.8 microns to provide a particle size distribution ratio (coarse:fine) of about 10:1 and a micrometer particle size of about 40 microns. Skim milk powder was air-jet milled to 3.4 and 4.7 microns and a defatted cocoa powder was milled to 3.5 microns. Bi-modal distributions were selected with a fine component at about 20% to about 40% by weight of the solids. Adjusting the above recipe to a fat-free basis (considering lecithin as 100% fat and the skim milk powder as 100% non-fat solids) provided the following:

| Non-Fat Solids | % (by weight) |
|---|---|
| Sucrose | 84 |
| Skim Milk Powder | 8 |
| Cocoa Powder | 8 |
| | 100 |

Each bi-modal chocolate sample I-V was prepared using the ingredient components as set out in Table 3, wherein each ingredient value represents the concentration of that ingredient, expressed as a percentage by weight of the total weight of the non-fat solid ingredients in this recipe. Cocoa solids and skim milk solids were maintained at 8%, by weight each, (solids basis) in the fine end of each distribution while a sucrose sample, having a mean particle size of 3.7 microns, was added to adjust the proportion of the fine particle mode distribution to about 20% to about 40% by weight of the blend. The bi-modal distributions were designed by using a 19.3 micron sucrose sample or a 35.8 micron sucrose sample to vary the mean particle size ratio (coarse:fine) from 5.2:1–9.7:1.

Dry conching of each sample was conducted for 5 hours at 60° C. jacket temperature (speed '4') in a KitchenAid planetary mixer (manufactured by KitchenAid, St. Joseph, Mich.). Soy lecithin (0.5% by weight) was added to each sample at the end of dry conche. Samples were wet conched at a speed setting of '6' until the viscosity reached a minimum. Afterwards, 0.5% by weight polyglycerol polyricinoleate (PGPR, ADMUL Wol®, sold by Quest International, Hoffman Estates, Ill.) was added and rheology measured after 60 minutes of wet mixing.

Dry conching initially took place at 16.5% total fat, by weight, for each bi-modal sample prepared, to ensure similar mixing consistency between the bi-modal distribution blend samples and the continuous distribution blend samples of Example A. The total fat concentration of the bi-modal blend sample was adjusted to 20.3% by weight by adding cocoa butter after the dry conche was completed, along with the emulsifier.

Rheology values for Casson yield and plastic viscosity were derived from flow curves using a TA Instruments AR1000 rheometer with a 4 cm diameter 40 cone/plate geometry. The following conditions were used for measuring the chocolate samples: pre-shear stress of 0 dynes/cm$^2$, pre-shear time of 0 minutes, and equilibration time of 1 minute. The experiment mode of shear rate sweep was done at 40° C. starting at 0 sec$^{-1}$ ending at 9 sec$^{-1}$ using a linear rate mode. The ascent time was 8 min. with no hold time at maximum stress followed by an 8 min. descent time. Casson values from the 'up' and 'down' curves were averaged and reported in Table 3.

TABLE 3

| | 70/30 | 70/30 | 70/30 | 80/20 | 60/20 | Cntrl |
|---|---|---|---|---|---|---|
| | | | Sample* | | | |
| Ingredient* | I | II | III | IV | V | C |
| Sucrose 19.3 μm | | | 70% | | | |
| Sucrose 25.4 μm | | 70% | | | | |
| Sucrose | 70% | | | 80% | 60% | |
| 35.8 μm Sucrose | 14% | 14% | 14% | 4% | 24% | |
| 3.7 μm Skim Milk Powder | 8% | 8% | 8% | 8% | 8% | |
| 3.5 μm Defatted Cocoa Powder | 8% | 8% | 8% | 8% | 8% | |
| 3.5 μm Micrometer Particle Size (μm) | 44 | 33 | 18 | 45 | 40 | 47 |
| Plastic Viscosity (Poise) | 46.8 | 46.3 | 80.5 | 52.3 | 41.8 | 107.5 |
| Yield Value (dynes/cm$^2$) | 313.9 | 341 | 277 | 228.7 | 344.6 | 885.3 |
| Plastic Viscosity w/PGPR (poise) | 63 | 43.9 | 82 | 57.2 | 38.3 | 57.7 |
| Yield Value w/PGPR (dynes/cm$^2$) | 16.7 | 13.8 | 20.2 | 12.5 | 40.9 | 86.1 |
| Conching | 16.5 | 16.5 | 16.5 | 16.5 | 16.5 | 19.7 |
| Total Fat % | 20.6 | 20 | 20.6 | 20.4 | 19.7 | 20.1 |

*mean particle size

COMPARATIVE EXAMPLE 1—CONTROL

The Control Example reported in Table 3 was prepared according to the following procedure. Anhydrous milk fat (37.6 g), cocoa butter (117 g), sucrose (534 g), defatted alkalized cocoa powder (50.9 g) and skim milk powder (50.9 g) was mixed at speed setting '2' using a Kitchen Aid Professional model mixer with a jacketed 5 qt mixing bowl, at 60° C., to form a paste. This paste was refined using a three-roll refiner to obtain a smooth paste having a mean particle size of 40 microns (by micrometer). The refined flakes were returned to the 5 qt bowl and mixed for 4 hours at speed setting '4'. At the end of this dry mixing/conching, 0.5% by weight soy lecithin was added and mixing continued at speed setting '6' until viscosity remained stable (i.e., did not drop further). Polyglycerol polyricinoleate (0.5% by weight) was added and the resulting mixture was blended at speed setting '6' for 1 hour. The resulting mixture had a total fat concentration 20.1% by weight and a micrometer particle size of 47 microns.

EXAMPLE 4

Five samples of reduced-fat chocolate, having continuous particle size distributions, were prepared by blending of selected ingredients, according to the same recipe and in a similar manner to that used in Example 3. Dry conching and determination of the rheology values of the continuous distribution samples was conducted according to the procedure in Example 1. As indicated in Table 4, the reduced-fat chocolates, having continuous particle size distributions, were prepared such that n varied between 0.2–0.5. Each chocolate sample I-V was prepared using the ingredient components as set out in Table 4, wherein each ingredient value represents the concentration of that ingredient, expressed as a percentage by weight of the total weight of the non-fat solid ingredients in this recipe.

TABLE 4

| Material | n = 0.2<br>I | n = 0.29<br>II | n = 0.37<br>Sample*<br>III | n = .45<br>IV | n = 0.5<br>V |
|---|---|---|---|---|---|
| Sucrose 9.6 μm | 0.6% | 35% | 29% | 20% | 20.5% |
| Sucrose 19.3 μm | 39.2% | 1% | 9% | 22.9% | 20.5% |
| Sucrose 35.8 μm | 44.2% | 48% | 46% | 41.1% | 43% |
| Skim Milk Powder 3.5 μm | 8% | 8% | 8% | 8% | 8% |
| Defatted Cocoa Powder 3.5 μm | 8% | 8% | 8% | 8% | 8% |
| Micrometer Particle Size (μm) | 39 | 42 | 39 | 42 | 40 |
| Plastic Viscosity (Poise) | 67 | 95.1 | 64 | 67 | 63 |
| Yield Value (dynes/cm²) | 207.2 | 208.4 | 172.7 | 183.5 | 240.7 |
| Plastic Viscosity w/PGPR (poise) | 109.2 | 95.5 | 85.2 | 123.4 | 129.8 |
| Yield Value w/PGPR (dynes /cm²) | 2.1 | 3.1 | 1.6 | 3.8 | 1.3 |
| Conching Fat (%) | 19.7 | 19.7 | 19.7 | 19.7 | 19.7 |
| Total Fat % | 20.2 | 19.8 | 19.9 | 19.3 | 19.8 |

*mean particle size

EXAMPLE 5

A reduced-fat chocolate having a bi-modal particle size distribution was prepared according to the following procedure and recipe.

| Ingredient | Weight % | Fat Free Solids, Weight % |
|---|---|---|
| Sugar (10X, 25 μm) | 55.2 | 68.5 |
| Skim Milk Powder (3.5 μm) | 20.5 | 25.4 |
| Cocoa Powder (3.5 μm) | 5.5 | 6.1 |
| (10–12% fat) | | 100% |
| Cocoa Butter | 14.3 | |
| Milk Fat (anhydrous) | 4.0 | |
| Soy Lecithin | 0.6 | |
| Methyl vanillin | 0.01 | |
| | 100% | |

Skim milk powder and 10/12 cocoa powder (containing 10–12% total fat) were blended in a ratio of 79:21 parts by weight and air-jet milled using a Fluid Energy Aljet Roto-Jet mill, model 5, to a mean particle size of 3.5 microns. Confectioners sugar (10x) was air classified to a mean particle size of 25 microns. Anhydrous milk fat (120 g), cocoa butter (427 g), 25 micron classified 10x sucrose (1652 g) and the co-milled skim milk and cocoa powder (777 g of the mixture prepared above) were combined and conched/mixed using a Littleford Day model 5 plough mixer at speed setting of '4' for 20 hours, followed by addition of 0.5% soy lecithin and continued mixing at speed setting of '9' for an additional 3 hours. After this conching/mixing cycle was completed, lecithin (an additional 0.1%) and 0.01% methyl vanillin were added and mixing continued until these added ingredients were dispersed. The ingredients of this milk chocolate possessed a bi-modal distribution with a fine particle mode, comprising 31.5% of the distribution, with a mean particle size of about 3.5 microns and a coarse particle mode, comprising 68.5% of the distribution, with a mean particle size of about 25 microns. The ratio of coarse:fine was 25:3.5, or 7.1:1. The milk chocolate thus prepared, with a total fat content of 19.9% by weight and a micrometer particle size of 32 microns, demonstrated a plastic viscosity of 38 poise and yield value of 190 dynes/cm².

EXAMPLE 6

A reduced-fat chocolate was prepared according to the recipe and process of Example 5, except that 0.5% by weight soy lecithin and 0.4% by weight sucrose polyerucate (ER-290, sold by Mitsubishi Kasei Corporation, Japan) were added at the end of the mixing/conching cycle. The resulting chocolate, having 19.9% by weight total fat, demonstrated a plastic viscosity of 24.6 poise and yield value of 138.3 dynes/cm².

EXAMPLE 7

A reduced-fat chocolate having a continuous particle size distribution and a distribution modulus, n=0.37 was prepared according to the following procedure. Skim milk powder was air-jet milled using a Fluid Energy Aljet Roto-Jet mill model 5 to a mean size of 3.4 microns and two fractions of confectioners sugar were produced by air classification. Confectioners sugar with a mean particle size of 25 microns (1398 g), confectioners sugar with a mean particle size of 9.6 microns (603 g), chocolate liquor with mean particle size of 10.1 microns (419 g), skim milk with a mean particle size of 3.4 microns (217 g, airjet milled), anhydrous milk fat (143 g) and cocoa butter (220 g) were combined and conched/mixed in a Littleford-Day plough mixer for 11 hours, on speed '4,' followed by addition of soy lecithin (15 g, 0.5% by weight) and continued mixing for 3 hours at speed '9'. The final milk chocolate, having 20.3% by weight total fat and a micrometer particle size of 31 microns, demonstrated a Casson viscosity of 55 poise and a yield value of 92 dynes/cm².

EXAMPLE 8

A reduced-fat chocolate was prepared according to the recipe and process of Example 7, except that 0.5% by weight soy lecithin and 0.5% by weight sucrose polyerucate were added at the end of the conching cycle. The resulting chocolate possessed 20.3% by weight total fat, having a plastic viscosity of 38.3 poise and yield value of 65.6 dynes/cm².

EXAMPLE 9

A reduced-fat chocolate having a bi-modal particle size distribution was prepared according to the following procedure and recipe.

| Ingredient | Mean Size (μm) | Weight % | Fat Free Solids Weight % |
|---|---|---|---|
| Sugar (10X) | 35.8 | 58.1 | 69.8 |
| Sugar (10X) | 3.7 | 11.6 | 14.0 |
| Cocoa powder (defatted) | 3.6 | 6.7 | 8.1 |
| Skim Milk powder | 3.4 | 6.7 | 8.1 |
|  |  |  | 100% |
| Cocoa Butter |  | 12.8 |  |
| Milk Fat (anhydrous) |  | 3.6 |  |
| Soy Lecithin |  | 0.5 |  |
|  |  | 100% |  |

Skim milk powder having a mean particle size of 3.4 microns was prepared by air-jet milling and confectioners sugar having a mean particle size of 35.8 microns was produced by air classification. A second sample of confectioners sugar, having a mean particle size of 3.7 microns, and a sample of defatted cocoa powder, having a mean particle size of 3.6 microns, were also produced via airjet milling. Confectioners sugar, with a mean particle size of 35.8 microns (445 g), confectioners sugar with a mean particle size of 3.7 microns (89 g), milled cocoa powder (51 g), milled skim milk (51 g), anhydrous milk fat (28 g) and cocoa butter (98 g) were mixed in a KitchenAid mixer for 5 hours on speed '4' followed by addition of soy lecithin (0.5% by weight) and continued mixing for 5 hours at speed '6' provided a chocolate ingredient mixture having a bi-modal distribution with a fine particle mode, comprising 30% of the distribution, with a mean particle size of about 3.7 microns and a coarse particle mode, comprising 70% of the distribution, with a mean particle size of about 35.8 microns. The ratio of coarse:fine was 35.8:3.7, or 9.6:1. Polyglycerol polyricinoleate (0.5% by weight) was added to the fluid chocolate and mixing was continued for an additional 1 hour. The resulting milk chocolate, having 17.2% by weight total fat and a particle size of 41 microns, demonstrated a Casson viscosity of 139 poise and a yield value of 42 dynes/cm$^2$.

EXAMPLE 10

Six samples of chocolate, having total fat content of 20% and having bi-modal particle size distributions, were prepared by blending of selected ingredients, according to the following recipe:

| Ingredient | Weight % |
|---|---|
| Sucrose | 53.88 |
| Skim Milk Powder | 10.49 |
| Lactose | 9.45 |
| Chocolate Liquor | 12.50 |
| Cocoa Butter | 9.47 |
| Anhydrous Milk Fat | 3.2 |
| Soy lecithin | 0.7 |
| PGPR | 0.35 |
| Methyl vanillin | 0.01 |
|  | 100.0% |

Total fat 20.0% by weight

Adjusting the above recipe to a fat-free basis (considering lecithin as 100% fat and the skim milk powder as 100% non-fat solids) provides the following:

| Non-Fat Solids | % (by weight) |
|---|---|
| Sucrose | 67.7 |
| Skim Milk Powder | 13.2 |
| Lactose | 11.9 |
| Cocoa | 7.2 |
|  | 100.0% |

The first three ingredients, sucrose, skim milk and lactose were first prepared as crumb using conventional procedures. Six particle sizes of the crumb were produced with mean volume sizes between 2.4 and 35.6 μm using a CCE model 250 classifier, Blue Tech APCM 10 mill and Fluid Energy Aljet air-jet mill model 5. Bi-modal distributions were selected with a fine component at about 20% to about 50% by weight of the solids and the bi-modal distributions were designed to vary the mean particle size ratio (coarse crumb/fine crumb) between 9:1 to 15:1. Each bi-modal chocolate sample I-V was prepared using the ingredient distributions as set out in Table 5, wherein each ingredient value represents the concentration of the non-fat solids content of that ingredient expressed as a percentage by weight of the total weight of the non-fat solids ingredients in the chocolate.

Dry conching of 2 kg. of each sample was conducted for 5 hours at 50° C. jacket temperature (speed '4') in an M-5 Littleford Day plough mixer. Soy lecithin (0.5% by weight) was added to each sample at the end of dry conche. Samples were wet conched at a speed setting of '9' for one hour. A 1 kg. sample of each chocolate was further liquefied in a Hobart mixer model N-50 at speed '3' for 30 minutes, during which incremental soy lecithin (up to a total concentration of 0.7% by weight) and/or polyglycerol polyricinoleate (up to 0.35% by weight) was added.

Rheology values for Casson yield and plastic viscosity were derived from flow curves using a TA Instruments AR1000 rheometer with a 4 cm diameter 4° cone/plate geometry. The rheology of the samples was determined soon after preparation and placed in a 50° C. oven for 30 minutes prior to measurement. The following conditions were used for measuring the chocolate samples: pre-shear stress of 0 dynes/cm$^2$, pre-shear time of 0 minutes, and equilibration time of 5 minutes. The experiment mode of shear rate sweep was done at 40° C. starting at 0 sec$^{-1}$ ending at 9 sec$^{-1}$ using a linear rate mode. The ascent time was 8 min. with no hold time at maximum stress followed by an 8 min. descent time. Casson values from the 'up' and 'down' curves were averaged and reported in Table 5.

TABLE 5

|  | 50/50 | 60/40 | 70/30 | 70/30 | 70/30 | 80/20 |
|---|---|---|---|---|---|---|
|  |  |  | Sample* |  |  |  |
| Ingredient* | I | II | III | IV | V | VI |
| Crumb 2.4 μm | 43% | 33% | 23% | 23% | 23% | 23% |
| Crumb 21.6 μm | 50% | 60% | 70% |  |  | 70% |
| Crumb 25.3 μm |  |  |  | 70% |  |  |
| Crumb 35.6 μm |  |  |  |  | 70% |  |
| Chocolate Liquor | 7% | 7% | 7% | 7% | 7% | 7% |

TABLE 5-continued

| Ingredient* | 50/50 I | 60/40 II | 70/30 Sample* III | 70/30 IV | 70/30 V | 80/20 VI |
|---|---|---|---|---|---|---|
| 8.5 μm Micrometer Particle Size (μm) | 20 | 22 | 20 | 36 | 43 | 23 |
| Plastic Viscosity (Poise) | 54 | 45 | 54 | 57 | 71 | 84 |
| Yield Value (dynes/cm²) | 614 | 540 | 354 | 408 | 427 | 372 |
| Plastic Viscosity w/PGPR (poise) | 39 | 36 | 51 | 51 | 57 | 72 |
| Yield Value w/PGPR (dynes/cm²) | 127 | 157 | 113 | 153 | 171 | 115 |
| Total Fat % | 20.1 | 19.6 | 20.1 | 20.3 | 19.8 | 20.8 |

*mean particle size

Other variations or modifications, which will be obvious to those skilled in the art, are within the scope and teachings of this invention. This invention is not to be limited except as set forth in the following claims.

We claim:

1. A confectionery comprising an admixture of solids-containing ingredients and fat, having a yield value of less than 1000 dynes/cm²,
    wherein said solids-containing ingredients comprise particles having a particle size distribution of about 0.05 microns to about 100 microns;
    wherein said distribution is a bi-modal particle distribution comprised of a fine particle mode distribution comprising particles having a mean particle size of about 0.5 to about 10 microns, and a coarse particle mode distribution comprising particles having a mean particle size of about 15 to about 50 microns, and a ratio of the mean particle size of the particles in the coarse mode to the mean particle size of the particles in the fine mode is about 5.5:1 to about 11:1,
    wherein the particles comprising said fine particle mode distribution comprise about 20% to about 50% by weight of the solids-containing ingredients and the particles comprising said coarse particle mode distribution comprise about 50% to about 80% by weight of the solids-containing ingredients,
    wherein the composition of the particle mode distributions is based on the weight of de-fatted ingredients, and the composition of the solids-containing ingredients comprising the fine particle mode are selected from the group consisting of carbohydrates, cocoa solids-containing ingredients, milk solids-containing ingredients, and an ingredient combination thereof, and the composition of the solids-containing ingredients comprising the coarse particle mode are selected from the group consisting of cocoa solids-containing ingredients, carbohydrates, and ingredient combinations of cocoa solids-containing ingredients, carbohydrates and milk solids-containing ingredients,
    wherein said fat comprises about 16% to about 35% by weight of the total weight of the confectionery, and said confectionary is chocolate.

2. The confectionery according to claim 1, wherein the chocolate is a reduced-fat chocolate comprising about 16% to about 24.5% total fat, by weight.

3. The confectionery according to claim 2 having a Casson plastic viscosity less than 100 poise and a Casson yield value less than 200 dynes/cm².

4. The confectionery according to claim 2, further comprising an emulsifying agent combination selected from the group consisting of (i) lecithin and polyglycerol polyricinoleate, (ii) lecithin, ammonium phosphatides and polyglycerol polyricinoleate, (iii) lecithin and sucrose polyerucate, (iv) polyglycerol polyricinoleate and sucrose polyerucate, and (v) lecithin, polyglycerol polyricinoleate, and sucrose polyerucate.

5. The confectionery according to claim 2 or 4, wherein the particles in the fine particle mode distribution comprise about 30% to about 50% by weight of the total weight of the solids-containing ingredients, the particles in the coarse particle mode distribution comprise about 50% to about 70% by weight of the total weight of the solids-containing ingredients.

6. The confectionery according to claim 2 or 4, wherein the particles in the fine particle mode distribution comprise about 40% to about 50% by weight of the total weight of the solids-containing ingredients, the particles in the coarse particle mode distribution comprise about 50% to about 60% by weight of the total weight of the solids-containing ingredients.

7. The confectionery according to claim 1, wherein said confectionery has a micrometer particle size of less than 50 microns.

8. The confectionery according to claim 1, further comprising an emulsifying agent or an emulsifying agent combination.

9. The confectionery according to claim 1, further comprising an emulsifying agent selected from the group consisting of lecithin, ammonium phosphatides, polyglycerol polyricinoleate, and sucrose polyerucate.

10. A confectionery comprising the admixture of non-fat solid ingredients and fat, containing about 16% to about 35% by weight total fat and having a yield value of less than 1000 dynes/cm², wherein said non-fat solid ingredients comprise particles having a particle size distribution of about 0.05 microns to about 100 microns, and have a particle size distribution in accordance with the following formula:

$$\frac{CPFT}{100\%} = \frac{D^n - D_s^n}{D_L^n - D_s^n}$$

wherein,
    CPFT=cumulative percent of particles in a continuous distribution having a particle size finer than a specified particle size;
    $D_L$=the largest particle diameter size in the distribution;
    $D_s$=the smallest particle diameter size in the distribution;
    D=a particle size in the distribution;
    n=about 0.2 to about 0.7, and
        wherein the composition of the solids-containing ingredients having a particle size of about 0.05 microns to about 30 microns is selected from the group consisting of carbohydrates, cocoa solids-containing ingredients, milk solids-containing ingredients, and ingredient combinations thereof, and the composition of the solids-containing ingredients having a particle size of about 30 microns to about 100 microns is selected from the group consisting of cocoa solids-containing ingredients, carbohydrates, milk solids-containing ingredients, and ingredient combinations thereof.

11. The confectionery according to claim 10, wherein said confectionery is chocolate.

12. The confectionery according to claim 11, wherein the chocolate is a reduced-fat chocolate comprising about 16% to about 24.5% total fat, by weight.

13. The confectionery according to claim 11, having a Casson plastic viscosity less than 100 poise and a Casson yield value less than 200 dynes/cm$^2$.

14. The confectionery according to claim 11, wherein said confectionery has a micrometer particle size of less than 50 microns.

15. The confectionery according to claim 11, further comprising an emulsifying agent or an emulsifying agent combination.

16. The confectionery according to claim 11, further comprising an emulsifying agent selected from the group consisting of lecithin, ammonium phosphatides, polyglycerol polyricinoleate, and sucrose polyerucate.

17. The confectionery according to claim 10, wherein $D_L$ is about 80 microns to about 40 microns.

18. The confectionery according to claim 10, wherein $D_s$ is about 0.05 microns to about 0.3 microns.

19. A method of preparing a chocolate, suitable for enrobing, extruding or moulding, and comprising about 16% to about 35% total fat, by weight, said method comprising the steps of:
   (i) providing a mixture of solids-containing ingredients used in the preparation of chocolates comprising particles having mean particle sizes of about 0.1 micron to about 50 microns, said particles having a bi-modal particle size distribution comprising a fine particle mode distribution and coarse particle mode distribution, wherein the particles comprising the fine particle mode distribution have a mean particle size of about 0.5 microns to about 10 microns and the particles comprising the coarse particle mode distribution have a mean particle size of about 10 microns to about 50 microns,
      wherein the particles in the fine particle mode distribution comprise about 20% to about 50% by weight of the total weight of the solids-containing ingredients, the particles in the coarse particle mode distribution comprise about 50% to about 80% by weight of the total weight of the solids-containing ingredients, and a ratio of the mean particle size of the particles in the coarse mode to the mean particle size of the particles in the fine mode is about 5.5:1 to about 11:1, and
      wherein the composition of the solids-containing ingredients comprising the fine particle mode are selected from the group consisting of carbohydrates, cocoa solids-containing ingredients, milk solids-containing ingredients, and ingredient combinations thereof, and the composition of the solids-containing ingredients comprising the coarse particle mode are selected from the group consisting of carbohydrates, cocoa solids-containing ingredients, and ingredient combinations of cocoa solids-containing ingredients, carbohydrates and milk solids-containing ingredients;
   (ii) conching the mixture with fat to form a chocolate suspension, wherein the fat includes cocoa butter, milk fat or a fat substitute, and the fat comprises about 15.5% to about 34.5% by weight of the total weight of the chocolate suspension; and
   (iii) blending the chocolate suspension with an emulsifier or a combination of emulsifiers to form a chocolate having a Casson viscosity of less than 200 poise, a Casson yield value less than 1000 dynes/cm$^2$, and micrometer particle size less than 50 microns.

20. The method according to claim 19, wherein the solids-containing ingredients in the fine particle mode distribution comprise an ingredient combination containing a combination of ingredients selected from the group consisting of cocoa solids-containing ingredients, carbohydrates, and milk solids-containing ingredients.

21. The method according to claim 19, further comprising selecting the composition of the solids-containing ingredients in the fine particle mode distribution from the group consisting of cocoa solids-containing ingredients and milk solids-containing ingredients.

22. The method according to claim 19, wherein the chocolate is a reduced-fat chocolate comprising about 16% to about 24.5% total fat, by weight.

23. The method according to claim 19 or 22, further comprising providing a mixture of non-fat solid ingredients.

24. The method according to claim 22, further comprising adding an emulsifying agent combination selected from the group consisting of (i) lecithin and polyglycerol polyricinoleate, (ii) lecithin, ammonium phosphatides and polyglycerol polyricinoleate, (iii) lecithin and sucrose polyerucate, (iv) polyglycerol polyricinoleate and sucrose polyerucate, and (v) lecithin, polyglycerol polyricinoleate, and sucrose polyerucate.

25. The method according to claim 22 or 24, wherein the particles in the fine particle mode distribution comprise about 30% to about 50% by weight of the total weight of the solids-containing ingredients, the particles in the coarse particle mode distribution comprise about 50% to about 70% by weight of the total weight of the solids-containing ingredients.

26. The method according to claim 22 or 24, wherein the particles in the fine particle mode distribution comprise about 40% to about 50% by weight of the total weight of the solids-containing ingredients, the particles in the coarse particle mode distribution comprise about 50% to about 60% by weight of the total weight of the solids-containing ingredients.

27. The method according to claim 19, further comprising forming a chocolate having a Casson plastic viscosity less than 100 poise and a Casson yield value less than 200 dynes/cm$^2$.

28. The method according to claim 19, further comprising blending the chocolate suspension with an emulsifier selected from the group consisting of lecithin, ammonium phosphatides, polyglycerol polyricinoleate, and sucrose polyerucate.

29. A method of preparing a chocolate, suitable for enrobing, extruding or moulding, and comprising about 16% to about 35% total fat, by weight, said method comprising:
   (i) providing a mixture of solids-containing ingredients used in the preparation of chocolate comprising particles having a continuous particle size distribution and having particle sizes of about 0.05 micron to about 100 microns with at least 5% by weight of the particles having a particle size of less than 3.0 microns, wherein the continuous particle size distribution is substantially in accordance with the following formula:

$$\frac{CPFT}{100\%} = \frac{D^n - D_s^n}{D_L^n - D_s^n}$$

wherein,
$D_L$=the largest particle diameter size in the distribution
$D_s$=the smallest particle diameter size in the distribution
D=a particle size in the distribution
n=about 0.2 to about 0.7,
wherein the composition of the non-fat ingredients having a particle size of about 0.05 microns to about 30 microns is selected from the group consisting of carbohydrates, cocoa solids-containing ingredients and milk solids-containing ingredients, and ingredient combinations thereof, and the composition of the ingredients having a particle size of about 30 microns to about 100 microns is selected from the group consisting of carbohydrates, cocoa solids-containing ingredients and milk solids-containing ingredients, and ingredient combinations thereof;

(ii) conching non-fat solid mixture with fat to form a chocolate suspension, wherein the fat includes cocoa butter, milk fat or a fat substitute, and the fat comprises about 15.5% to about 34.5% by weight of the total weight of the chocolate suspension; and (iii) blending the chocolate suspension with an emulsifier or a combination of emulsifiers to form a chocolate having a Casson viscosity of less than 200 poise, a Casson yield value less than 1000 dynes/cm$^2$, and micrometer particle size less than 50 microns.

30. The method according to claim 29, further comprising selecting the composition of the non-fat ingredients having a particle size of about 0.05 microns to about 30 microns from the group consisting of cocoa solids-containing ingredients and milk solids-containing ingredients.

31. The method according to claim 29, wherein the non-fat ingredients having a particle size of about 30 microns to about 100 microns are carbohydrates.

32. The method according to claim 29, wherein the chocolate is a reduced-fat chocolate comprising about 16% to about 24.5% total fat, by weight.

33. The method according to claim 29, further comprising forming a chocolate having a Casson plastic viscosity less than 100 poise and a Casson yield value less than 200 dynes/cm$^2$.

34. The method according to claim 29, comprising providing a mixture of non-fat solid ingredients, wherein n is about 0.29 to about 0.5.

35. The method according to claim 29, comprising providing a mixture of non-fat solid ingredients wherein $D_L$ is about 80 microns to about 40 microns.

36. The method according to claim 29, comprising providing a mixture of non-fat solid ingredients wherein $D_s$ is about 0.05 microns to about 0.3 microns.

37. The method according to claim 29, comprising blending the chocolate suspension with an emulsifying agent combination selected from the group consisting of (i) lecithin and polyglycerol polyricinoleate, (ii) lecithin, ammonium phosphatides and polyglycerol polyricinoleate, (iii) lecithin and sucrose polyerucate, (iv) polyglycerol polyricinoleate and sucrose polyerucate, and (v) lecithin, polyglycerol polyricinoleate, and sucrose polyerucate.

38. A confectionery comprising an admixture of solids-containing ingredients and fat, having a yield value of less than 1000 dynes/cm$^2$,
wherein said solids-containing ingredients comprise particles having a particle size distribution of about 0.05 microns to about 100 microns;
wherein said distribution is a bi-modal particle distribution comprised of a fine particle mode distribution comprising particles having a mean particle size of about 0.5 to about 10 microns, and a coarse particle mode distribution comprising particles having a mean particle size of about 15 to about 50 microns,
wherein the particles comprising said fine particle mode distribution comprise about 20% to about 50% by weight of the solids-containing ingredients and the particles comprising said coarse particle mode distribution comprise about 50% to about 80% by weight of the solids-containing ingredients,
wherein the composition of the particle mode distributions is based on the weight of de-fatted ingredients, and the composition of the solids-containing ingredients comprising the fine particle mode are selected from the group consisting of carbohydrates, cocoa solids-containing ingredients, milk solids-containing ingredients, and ingredient combinations thereof, and the composition of the solids-containing ingredients comprising the coarse particle mode are selected from the group consisting of cocoa solids-containing ingredients, carbohydrates, milk solids-containing ingredients, and ingredient combinations thereof,
wherein said fat comprises about 16% to about 24.5% by weight of the total weight of the confectionery; and wherein
said confectionery is chocolate, and further comprises an emulsifying agent combination selected from the group consisting of (i) lecithin and polyglycerol polyricinoleate, (ii) lecithin, ammonium phosphatides and polyglycerol polyricinoleate, (iii) lecithin and sucrose polyerucate, (iv) polyglycerol polyricinoleate and sucrose polyerucate, and (v) lecithin, polyglycerol polyricinoleate, and sucrose polyerucate.

39. The confectionery according to claim 38, wherein a ratio of the mean particle size of the particles in the coarse mode to the mean particle size of the particles in the fine mode is about 5.5:1 to about 11:1.

40. The confectionery according to claim 38, wherein the particles in the fine particle mode distribution comprise about 30% to about 50% by weight of the total weight of the solids-containing ingredients, the particles in the coarse particle mode distribution comprise about 50% to about 70% by weight of the total weight of the solids-containing ingredients.

* * * * *

UNITED STATES PATENT AND TRADEMARK OFFICE
CERTIFICATE OF CORRECTION

PATENT NO. : 6,391,373 B1
DATED : May 21, 2002
INVENTOR(S) : Kaiser et al.

It is certified that error appears in the above-identified patent and that said Letters Patent is hereby corrected as shown below:

<u>Title page,</u>
Item [56], OTHER PUBLICATIONS,
1st and 2nd references,
Each occurrence of "Mongia & Ziegler" should read -- Mongia & Ziegler, --;
Each occurrence of "Presented at" should read -- , Presented at --; and
Each occurrence of "1997 Penn State" should read -- 1997, Penn State --.
3rd references,
"Beckett 1998" should read -- Beckett, 1998 --;
"Manufacture and Use" should read -- Manufacture and Use, --;
"Minifre 1980" should read -- Minifie, 1980 --;
4th reference
"Technology 2nd" should read -- Technology, 2nd --; and
"Westport CT p 323-325" should read -- Westport, CT, p 323-325 --.

<u>Column 3,</u>
Line 34, "fines" should read -- fine --;
Line 41, "This process" should read -- This process, --;
Line 43, "values related" should read -- values are related --; and
Line 49, "60 microns" should read -- 60 microns, --.

<u>Column 4,</u>
Line 64, "distributions" should read -- distribution --.

<u>Column 6,</u>
Line 37, "of a three" should read -- of three --.

<u>Column 7,</u>
Line 42, "States is subject" should read -- States subject --.

<u>Column 8,</u>
Line 51, "of present" should read -- of the present --.

<u>Column 10,</u>
Line 54, "solid ingredient" should read -- solid ingredients --.

UNITED STATES PATENT AND TRADEMARK OFFICE
CERTIFICATE OF CORRECTION

PATENT NO. : 6,391,373 B1
DATED : May 21, 2002
INVENTOR(S) : Kaiser et al.

It is certified that error appears in the above-identified patent and that said Letters Patent is hereby corrected as shown below:

<u>Column 12,</u>
Line 23, "that may" should read -- that may be --.

<u>Column 13,</u>
Line 65, "operations may" should read -- operations, may --.

<u>Column 15,</u>
Line 22, "fill-in" should read -- fill in --; and
Line 57, "wherein-the" should read -- wherein the --.

<u>Column 16,</u>
Lines 34 and 47, each occurrence of "value less" should read -- value is less --; and
Lines 35 and 48, each occurrence of "viscosity less" should read -- viscosity is less --.

<u>Column 17,</u>
Line 25, "phenomena" should read -- phenomenon --.

<u>Column 18,</u>
Line 7, "inflection" should read -- inflections --.

<u>Column 19,</u>
Line 67, "viscosity-than" should read -- viscosity than --.

<u>Column 22,</u>
Line 26, "Aljet, Inc." should read -- Aljet, Inc., --.

<u>Column 23,</u>
Lines 14 and 15, "mixer, manufactured" should read -- mixer (manufactured --;
Line 15, "Day, Inc." should read -- Day, Inc., -- and
Line 22, "if" should read -- of --.

<u>Column 26,</u>
Line 39, "Kitchen Aid" should read -- KitchenAid --.

UNITED STATES PATENT AND TRADEMARK OFFICE
CERTIFICATE OF CORRECTION

PATENT NO. : 6,391,373 B1
DATED : May 21, 2002
INVENTOR(S) : Kaiser et al.

It is certified that error appears in the above-identified patent and that said Letters Patent is hereby corrected as shown below:

Column 27,
Lines 48 to 50, "Cocoa Powder (3.5 µm)     5.5     6.1

(10-12% fat)                        100%" should read
-- Cocoa Powder (3.5 µm)     5.5     6.1
   (10-12% fat)                      100% --.

Column 29,
Lines 9 to 11, "Skim Milk       3.4     6.7     8.1 powder
                                    100%" should read
-- Skim Milk Powder    3.4     6.7     8.1
                                    100% --.

Column 30,
Line 14, "and lactose" should read -- and lactose, --.

Signed and Sealed this

Twenty-eighth Day of January, 2003

JAMES E. ROGAN
*Director of the United States Patent and Trademark Office*